United States Patent
Sasaki

(10) Patent No.: US 11,003,157 B2
(45) Date of Patent: May 11, 2021

(54) NUMERICAL CONTROLLER FOR MACHINE TOOL WITH INSTALLATION ERROR COMPENSATION UNIT

(71) Applicant: FANUC CORPORATION, Yamanashi (JP)

(72) Inventor: Takafumi Sasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/402,272

(22) Filed: May 3, 2019

(65) Prior Publication Data
US 2019/0361420 A1    Nov. 28, 2019

(30) Foreign Application Priority Data
May 24, 2018  (JP) .............................. JP2018-099846

(51) Int. Cl.
*G05B 19/00*    (2006.01)
*G05B 19/402*    (2006.01)
(Continued)

(52) U.S. Cl.
CPC ......... *G05B 19/402* (2013.01); *G05B 19/404* (2013.01); *G05B 19/4069* (2013.01); *G05B 19/4155* (2013.01)

(58) Field of Classification Search
CPC .............. G05B 19/402; G05B 19/4155; G05B 19/4069; G05B 19/404; G05B 2219/50049; G05B 2219/34085
See application file for complete search history.

(56) References Cited

U.S. PATENT DOCUMENTS 4,162,527 A * 7/1979 Kilbane ................. G05B 19/41
                                                    700/176
5,661,654 A * 8/1997 Nagashima ........ G05B 19/4163
                                                    318/572
(Continued)

FOREIGN PATENT DOCUMENTS

JP    S63-132307 A    6/1988
JP    S63-305407 A    12/1988
(Continued)

OTHER PUBLICATIONS

Office Action issued in JP 2018-099846; mailed by the Japanese Patent Office dated Apr. 7, 2020.

*Primary Examiner* — Michael D Masinick
(74) *Attorney, Agent, or Firm* — Studebaker & Brackett PC

(57) ABSTRACT

A numerical controller includes a work installation error compensation unit, and the work installation error compensation unit includes a tool position and direction calculation unit and an error compensation unit that selects the positions of two rotary axes according to a first method of selecting a solution close to a previous solution or a second method of selecting a solution close to a command value when a plurality of solutions is present. The numerical controller further includes a look ahead unit that looks ahead a program, and the work installation error compensation unit performs error compensation on the looked ahead command value according to the first method to obtain a compensation command value and sets the first method when the compensation command value is within a movable region of a five-axis machine tool while setting the second method when the compensation command value is outside the movable region.

9 Claims, 27 Drawing Sheets

(51) Int. Cl.
    *G05B 19/4155*     (2006.01)
    *G05B 19/4069*     (2006.01)
    *G05B 19/404*     (2006.01)

(56) References Cited

U.S. PATENT DOCUMENTS

| | | | |
|---|---|---|---|
| 2003/0171847 A1 | 9/2003 | Cheng et al. | |
| 2009/0093905 A1* | 4/2009 | Otsuki | G05B 19/4086 |
| | | | 700/174 |
| 2012/0310405 A1* | 12/2012 | Aizawa | G05B 19/4103 |
| | | | 700/186 |
| 2019/0196440 A1* | 6/2019 | Nagaoka | G05B 19/402 |

FOREIGN PATENT DOCUMENTS

| | | | |
|---|---|---|---|
| JP | 401228727 A * | 9/1989 | |
| JP | H07-299697 A | 11/1995 | |
| JP | 2003-195917 A | 7/2003 | |
| JP | 2006-227724 A | 8/2006 | |
| JP | 4291386 B2 | 7/2009 | |
| JP | 2009-230552 A | 10/2009 | |
| JP | 5461980 B2 | 4/2014 | |

* cited by examiner

FIG. 13

| β | -1° | | Δτ | | 0.4° | | Ps | | Bs | | 0° | | Cs | | 90° | | |
|---|---|---|---|---|---|---|---|---|---|---|---|---|---|---|---|---|---|
| No. | Bc° | Cc° | | J | K | Ia | Ja | Ka | SOLUTION A<br>BaA | CaA | SOLUTION A(°)<br>CaA | DISTANCE<br>TO PsA(°²) | SOLUTION B<br>BaB | CaB |
| 0 | 20 | 90 | 2E-17 | 0.342 | 0.9397 | -0.016 | 0.342 | 0.9395 | 20.024 | 92.745 | 408.495 | -20.02 | -87.25 |
| 1 | 19.6 | 90 | 2E-17 | 0.3355 | 0.9421 | -0.016 | 0.3355 | 0.9419 | 19.624 | 92.806 | 392.994 | -19.62 | -87.19 |
| 2 | 19.2 | 90 | 2E-17 | 0.3289 | 0.9444 | -0.016 | 0.3289 | 0.9442 | 19.225 | 92.869 | 377.834 | -19.23 | -87.13 |
| 3 | 18.8 | 90 | 2E-17 | 0.3223 | 0.9466 | -0.017 | 0.3223 | 0.9465 | 18.826 | 92.935 | 363.017 | -18.83 | -87.07 |
| 4 | 18.4 | 90 | 2E-17 | 0.3156 | 0.9489 | -0.017 | 0.3156 | 0.9487 | 18.426 | 93.003 | 348.545 | -18.43 | -87 |
| (OMITTED) |
| 27 | 9.2 | 90 | 1E-17 | 0.1599 | 0.9871 | -0.017 | 0.1599 | 0.987 | 9.2537 | 96.15 | 123.456 | -9.254 | -83.85 |
| 28 | 8.8 | 90 | 9E-18 | 0.153 | 0.9882 | -0.017 | 0.153 | 0.9881 | 8.8562 | 96.432 | 119.804 | -8.856 | -83.57 |
| 29 | 8.4 | 90 | 9E-18 | 0.1461 | 0.9893 | -0.017 | 0.1461 | 0.9891 | 8.4589 | 96.74 | 116.985 | -8.459 | -83.26 |
| 30 | 8 | 90 | 9E-18 | 0.1392 | 0.9903 | -0.017 | 0.1392 | 0.9901 | 8.0619 | 97.079 | 115.102 | -8.062 | -82.92 |
| 31 | 7.6 | 90 | 8E-18 | 0.1323 | 0.9912 | -0.017 | 0.1323 | 0.9911 | 7.6651 | 97.452 | 114.286 | -7.665 | -82.55 |
| 32 | 7.2 | 90 | 8E-18 | 0.1253 | 0.9921 | -0.017 | 0.1253 | 0.992 | 7.2688 | 97.806 | 114.703 | -7.269 | -82.13 |
| 33 | 6.8 | 90 | 7E-18 | 0.1184 | 0.993 | -0.017 | 0.1184 | 0.9928 | 6.8728 | 98.327 | 116.569 | -6.873 | -81.67 |
| 69 | -7.6 | 90 | -8E-18 | -0.132 | 0.9912 | -0.017 | -0.132 | 0.9911 | 7.6651 | 262.55 | | -7.665 | 82.548 |
| 70 | -8 | 90 | -9E-18 | -0.139 | 0.9903 | -0.017 | -0.139 | 0.9901 | 8.0619 | 262.92 | | -8.062 | 82.921 |
| 71 | -8.4 | 90 | -9E-18 | -0.146 | 0.9893 | -0.017 | -0.146 | 0.9891 | 8.4589 | 263.26 | | -8.459 | 83.26 |
| 72 | -8.8 | 90 | -9E-18 | -0.153 | 0.9882 | -0.017 | -0.153 | 0.9881 | 8.8562 | 263.57 | | -8.856 | 83.568 |
| 73 | -9.2 | 90 | -1E-17 | -0.16 | 0.9871 | -0.017 | -0.16 | 0.987 | 9.2537 | 263.85 | | -9.254 | 83.85 |
| (OMITTED) |
| 96 | -18.4 | 90 | -2E-17 | -0.316 | 0.9489 | -0.017 | -0.316 | 0.9487 | 18.426 | 267 | | -18.43 | 86.997 |
| 97 | -18.8 | 90 | -2E-17 | -0.322 | 0.9466 | -0.017 | -0.322 | 0.9465 | 18.826 | 267.07 | | -18.83 | 87.065 |
| 98 | -19.2 | 90 | -2E-17 | -0.329 | 0.9444 | -0.016 | -0.329 | 0.9442 | 19.225 | 267.13 | | -19.23 | 87.131 |
| 99 | -19.6 | 90 | -2E-17 | -0.335 | 0.9421 | -0.016 | -0.335 | 0.9419 | 19.624 | 267.19 | | -19.62 | 87.194 |
| 100 | -20 | 90 | -2E-17 | -0.342 | 0.9397 | -0.016 | -0.342 | 0.9395 | 20.024 | 267.25 | | -20.02 | 87.255 |

PcA — COMPENSATION STARTING POINT A
PcB — COMPENSATION ENDING POINT A
PaA — LINEAR INTERPOLATION
PaB — COMPENSATION STARTING POINT B / COMPENSATION ENDING POINT B

FIG. 16

| β | −1° | Δτ | 0.4° | Ps | Bs | Ka | 0° | Cs | (DISTANCE TO Ps^2) | 90° | COMPENSATION STARTING POINT B |
|---|---|---|---|---|---|---|---|---|---|---|---|

| β | −1° | | Δτ | 0.4° | | Ps | | Bs | | | 0° | Cs | | 90° | COMPENSATION STARTING POINT B |
|---|---|---|---|---|---|---|---|---|---|---|---|---|---|---|---|
| | | | | | | | | | | | | | | SOLUTION | |
| No. | Bc° | Cc° | | J | K | Ja | Ia | | Ja | Ka | | BaA | CaA | (DISTANCE TO Ps^2) | BaB | CaB |
| 0 | 20 | 90 | 2E−17 | 0.342 | 0.9397 | −0.016 | 0.342 | 0.9395 | 20.024 | 92.745 | 408.495 | −20.02 | −87.25 |
| 1 | 19.6 | 90 | 2E−17 | 0.3355 | 0.9421 | −0.016 | 0.3355 | 0.9419 | 19.624 | 92.806 | 392.994 | −19.62 | −87.19 |
| 2 | 19.2 | 90 | 2E−17 | 0.3289 | 0.9444 | −0.016 | 0.3289 | 0.9442 | 19.225 | 92.869 | 377.834 | −19.23 | −87.13 |
| 3 | 18.8 | 90 | 2E−17 | 0.3223 | 0.9466 | −0.017 | 0.3223 | 0.9465 | 18.826 | 92.935 | 363.017 | −18.83 | −87.07 |
| 4 | 18.4 | 90 | 2E−17 | 0.3156 | 0.9489 | −0.017 | 0.3156 | 0.9487 | 18.426 | 93.003 | 348.545 | −18.43 | −87 |
| ... | (OMITTED) | | | | | | | | | | | | |
| 27 | 9.2 | 90 | 1E−17 | 0.1599 | 0.9871 | −0.017 | 0.1599 | 0.987 | 9.2537 | 96.15 | 123.456 | −9.254 | −83.85 |
| 28 | 8.8 | 90 | 9E−18 | 0.153 | 0.9882 | −0.017 | 0.153 | 0.9881 | 8.8562 | 96.432 | 119.804 | −8.856 | −83.57 |
| 29 | 8.4 | 90 | 9E−18 | 0.1461 | 0.9893 | −0.017 | 0.1461 | 0.9891 | 8.4589 | 96.74 | 116.985 | −8.459 | −83.26 |
| 30 | 8 | 90 | 9E−18 | 0.1392 | 0.9903 | −0.017 | 0.1392 | 0.99 | 8.0619 | 97.079 | 115.102 | −8.062 | −82.92 |
| 31 | 7.6 | 90 | 8E−18 | 0.1323 | 0.9912 | −0.017 | 0.1323 | 0.9911 | 7.6651 | 97.452 | 114.286 | −7.665 | −82.55 |
| 32 | 7.2 | 90 | 8E−18 | 0.1253 | 0.9921 | −0.017 | 0.1253 | 0.992 | 7.2688 | 97.166 | 114.703 | −7.269 | −82.13 |
| 33 | 6.8 | 90 | 7E−18 | 0.1184 | 0.993 | −0.017 | 0.1184 | 0.9928 | 6.8728 | 98.37 | 116.569 | −6.873 | −81.67 |
| ... | | | | | | | | | | | | | |
| 69 | −7.6 | 90 | −8E−18 | −0.132 | 0.9912 | −0.017 | −0.132 | 0.9911 | 7.6651 | 262.55 | | −7.665 | 82.546 |
| 70 | −8 | 90 | −9E−18 | −0.139 | 0.9903 | −0.017 | −0.139 | 0.9901 | 8.0619 | 262.92 | | −8.062 | 82.921 |
| 71 | −8.4 | 90 | −9E−18 | −0.146 | 0.9893 | −0.017 | −0.146 | 0.9891 | 8.4589 | 263.26 | | −8.459 | 83.26 |
| 72 | −8.8 | 90 | −9E−18 | −0.153 | 0.9882 | −0.017 | −0.153 | 0.9881 | 8.8562 | 263.57 | | −8.856 | 83.568 |
| 73 | −9.2 | 90 | −1E−17 | −0.16 | 0.9871 | −0.017 | −0.16 | 0.987 | 9.2537 | 263.85 | | −9.254 | 83.85 |
| ... | (OMITTED) | | | | | | | | | | | | |
| 96 | −18.4 | 90 | −2E−17 | −0.316 | 0.9489 | −0.017 | −0.316 | 0.9487 | 18.426 | 267 | | −18.43 | 86.997 |
| 97 | −18.8 | 90 | −2E−17 | −0.322 | 0.9466 | −0.017 | −0.322 | 0.9465 | 18.826 | 267.07 | | −18.83 | 87.065 |
| 98 | −19.2 | 90 | −2E−17 | −0.329 | 0.9444 | −0.016 | −0.329 | 0.9442 | 19.225 | 267.13 | | −19.23 | 87.131 |
| 99 | −19.6 | 90 | −2E−17 | −0.335 | 0.9421 | −0.016 | −0.335 | 0.9419 | 19.624 | 267.19 | | −19.62 | 87.194 |
| 100 | −20 | 90 | −2E−17 | −0.342 | 0.9397 | −0.016 | −0.342 | 0.9395 | 20.024 | 267.25 | | −20.02 | 87.255 |

Annotations: PcA, PmA, PaA (COMPENSATION STARTING POINT A), PpA (CURVE INTERPOLATION), PcB, PaB, PpB, COMPENSATION ENDING POINT A, COMPENSATION ENDING POINT B

FIG. 23

```
N1    G54.4 P1        ; START WORK INSTALLATION ERROR COMPENSATION
N2    G00             ; POSITIONING    SECOND METHOD-BASED WORK INSTALLATION ERROR COMPENSATION
N101  G01             CUTTING MODE
                      FIRST METHOD-BASED WORK INSTALLATION ERROR COMPENSATION IF OT FLAG [N101 TO N199] = 0
   ......             OTHERWISE, SECOND METHOD-BASED WORK INSTALLATION ERROR COMPENSATION
N199
N200  G00             ; POSITIONING    SECOND METHOD-BASED WORK INSTALLATION ERROR COMPENSATION
N201  G01             CUTTING MODE
                      FIRST METHOD-BASED WORK INSTALLATION ERROR COMPENSATION IF OT FLAG [N201 TO N299] = 0
   ......             OTHERWISE, SECOND METHOD-BASED WORK INSTALLATION ERROR COMPENSATION
N299
N300  G00             ; POSITIONING    SECOND METHOD-BASED WORK INSTALLATION ERROR COMPENSATION
      G54.4 P0        ; END WORK INSTALLATION ERROR COMPENSATION
```

FIG. 27

```
N1   G54.4 P1    ; START WORK INSTALLATION ERROR COMPENSATION
N2   G00         ; POSITIONING    THIRD METHOD-BASED WORK INSTALLATION ERROR COMPENSATION
N101 G01         CUTTING MODE
                 FIRST METHOD-BASED WORK INSTALLATION ERROR COMPENSATION IF OT FLAG [N101 TO N199] = 0
 ⋮               OTHERWISE, THIRD METHOD-BASED WORK INSTALLATION ERROR COMPENSATION
N199
N200 G00         ; POSITIONING    THIRD METHOD-BASED WORK INSTALLATION ERROR COMPENSATION
N201 G01         CUTTING MODE
                 FIRST METHOD-BASED WORK INSTALLATION ERROR COMPENSATION IF OT FLAG [N201 TO N299] = 0
 ⋮               OTHERWISE, THIRD METHOD-BASED WORK INSTALLATION ERROR COMPENSATION
N299
N300 G00         ; POSITIONING    THIRD METHOD-BASED WORK INSTALLATION ERROR COMPENSATION
     G54.4 P0    ; END WORK INSTALLATION ERROR COMPENSATION
```

NUMERICAL CONTROLLER FOR MACHINE TOOL WITH INSTALLATION ERROR COMPENSATION UNIT

This application is based on and claims the benefit of priority from Japanese Patent Application No. 2018-099846, filed on 24 May 2018, the content of which is incorporated herein by reference.

BACKGROUND OF THE INVENTION

Field of the Invention

The present invention relates to a numerical controller that controls a five-axis machine tool that machines a work fixed and attached to a table using three linear axes and two rotary axes.

Related Art

In a numerical controller that controls a five-axis machine tool that machines a work (a workpiece) attached to a table using three linear axes (X, Y, and Z-axes) and two rotary axes (any two axes of A, B, and C-axes around X, Y, and Z-axes, respectively), a tool tip point control method which is a method of issuing instructions related to a tool position, a tool direction, and a tool speed on an orthogonal coordinate system (a table coordinate system) fixed to the table and controlling the position, the direction, and the speed by converting the same to coordinate values of respective axes at control points of the machine is known as a method of controlling the coordinate values of respective axes (see Patent Document 1). In the tool tip point control, the tool position and speed are controlled, and the tool direction is controlled by interpolating the positions of the respective rotary axes.

In a numerical controller that controls a five-axis machine tool, a work installation error compensation function of compensating an installation error when a work is installed is known (for example, see Patent Documents 2 to 5). Patent Document 2 discloses a technology related to a method and a device for compensating an installation error of a workpiece. Patent Document 2 discloses means for compensating an installation error (an attachment error) of a work (a workpiece). This document discloses that a calculation which uses arctan is performed to obtain compensated B-axis and A-axis positions (for example, see Paragraphs 0043 and 0046). However, arctan generally has two solutions between 0° and 360°.

Like positions (B0,C0) of the B and C-axes in FIG. 18, in the case of the position of B=0°, a tool direction does not depend on the position of C. Such a position of B=0° is referred to as a singular point. When a tool is tilted by 20° in the Y-direction from the position (B0,C0), there are two solutions of the positions (B20,C90) and (B-20,C-90) (that is, (B340,C270)) of the B and C-axes. Among two solutions, the other solution is referred to as "another solution" when seen from one solution. As described above, in a five-axis machine tool, there are generally two sets of combinations between 0° and 360° of the positions of the two rotary axes for allowing a tool to be directed in a certain direction with respect to a work.

In work installation error compensation, when the two rotary axes are compensated (the tool direction is compensated), a numerical controller calculates the positions of the two rotary axes in order to tilt the tool direction by a tilting error of the work. In this case, it is necessary to select either one of two sets of positions present between 00 and 360°. Patent Documents 3 to 5 disclose a method of selecting the set of positions.

Patent Document 3 discloses a method (a first method) of selecting a solution close to a previous solution among the two solutions. Patent Document 4 discloses a method (a second method) of selecting a solution close to a command position among the two solutions. Patent Document 5 discloses a method (a third method) of switching to another solution at a timing at which the movement of the two rotary axes is minimized while selecting a solution close to a previous solution.

Patent Document 1: Japanese Unexamined Patent Application, Publication No. 2003-195917
Patent Document 2: Japanese Unexamined Patent Application, Publication No. H07-299697
Patent Document 3: Japanese Unexamined Patent Application, Publication No. S63-132307
Patent Document 4: Japanese Patent No. 4291386
Patent Document 5: Japanese Patent No. 5461980

SUMMARY OF THE INVENTION

As illustrated in FIG. 4, it is assumed that there is a small tilting error 3 around the Y-axis at an installation position of a work. In this case, when the tilting error 3 is compensated so that the position and the direction of a tool with respect to a work are maintained, as illustrated in FIGS. 5 and 6, the tool is tilted by the tilting error β around the Y-axis during installation of the work.

In the work installation error compensation according to the second or third method, when a command ranging from a command starting point to a command ending point crosses a singular point, as illustrated in FIG. 19, a tool direction (a tool direction when passing through a singular point) when passing through a singular point (B=0°) deviates (for example, rises) from an appropriate tool direction (a tool direction after work installation error compensation). For example, if the tilting error during work installation is small, no problem occurs since the deviation angle of the tool direction when passing through a singular point is small.

However, if the tilting error during work installation is large and the deviation angle of the tool direction when passing through a singular point increases (for example, a rising angle increases), an adverse effect on machining may occur. For example, interference between a work and a tool side surface or a machining fault during side surface machining may occur. In the work installation error compensation according to the first method, since a command does not pass through a singular point, a deviation of the tool direction does not occur.

An object of the present invention is to provide a numerical controller for a five-axis machine tool, capable of suppressing a tool direction from deviating from a tool direction after work installation error compensation when a command ranging from a command starting point to a command ending point passes a singular point.

(1) A numerical controller (for example, a numerical controller 10, 10A to be described later) according to the present invention is a numerical controller that controls a five-axis machine tool that machines a work attached to a table using three linear axes and two rotary axes, including: a work installation error compensation unit (for example, a work installation error compensation unit 13, 13A to be described later) that compensates an installation error during installation of the work, the work installation error compensation unit including: a tool position and direction calculation unit (for example, a tool position and direction calculation unit 131 to be described later) that calculates a position and a direction on a command coordinate system of a tool on the basis of command values of the three linear axes and the two rotary axes; and an error compensation unit (for example, an error compensation unit 132 to be described later) that performs error compensation with respect to the three linear axes and the two rotary axes using an error amount set in advance so as to correspond to the installation error during installation of the work so that the position and the direction on the command coordinate system of the tool calculated by the tool position and direction calculation unit are maintained on the work having the installation error, the error compensation unit selecting the positions of the two rotary axes to be compensated according to a first method of selecting a solution close to a previous solution or either one of a second method of selecting a solution close to the command value on the command coordinate system or a third method of switching to another solution at a timing at which movement of the two rotary axes is minimized while selecting a solution close to a previous solution when a plurality of solutions of trigonometric calculation is present, the numerical controller driving each axis on the basis of coordinate values of the three linear axes and the two rotary axes calculated by the work installation error compensation unit, the numerical controller further including: a look ahead unit (for example, a command analysis unit 11 to be described later) that looks ahead a program, wherein the work installation error compensation unit performs error compensation on the looked ahead command value according to the first method to obtain a compensation command value, and the work installation error compensation unit sets the first method-based error compensation when the compensation command value is within a movable region of the five-axis machine tool and sets either one of the second method-based error compensation or the third method-based error compensation when the compensation command value is outside the movable region of the five-axis machine tool.

(2) In the numerical controller according to (1), when the looked ahead command is a command of a machining mode, the work installation error compensation unit may set the first method-based error compensation to the machining mode when all of the compensation command values in a plurality of blocks of the machining mode are within the movable region of the five-axis machine tool, and the work installation error compensation unit may set either one of the second method-based error compensation or the third method-based error compensation to the machining mode when at least one of the compensation command values in the plurality of blocks of the machining mode is outside the movable region of the five-axis machine tool.

(3) In the numerical controller according to (1) or (2), the work installation error compensation unit may set either one of the second method-based error compensation or the third method-based error compensation when the looked ahead command is a command of a positioning mode.

According to the present invention, it is possible to provide a numerical controller for a five-axis machine tool, capable of suppressing a tool direction from deviating from a tool direction after work installation error compensation when a command ranging from a command starting point to a command ending point crosses a singular point.

BRIEF DESCRIPTION OF THE DRAWINGS

FIG. 13 is a table illustrating only error calculation and interpolation of a rotary axis corresponding to a command path in FIG. 12.

FIG. 16 is a table illustrating only error calculation and interpolation of a rotary axis corresponding to a command path illustrated in FIG. 15.

FIG. 23 is a diagram illustrating an example of a program.

FIG. 27 is a diagram illustrating an example of a program.

DETAILED DESCRIPTION OF THE INVENTION

Figure 1:
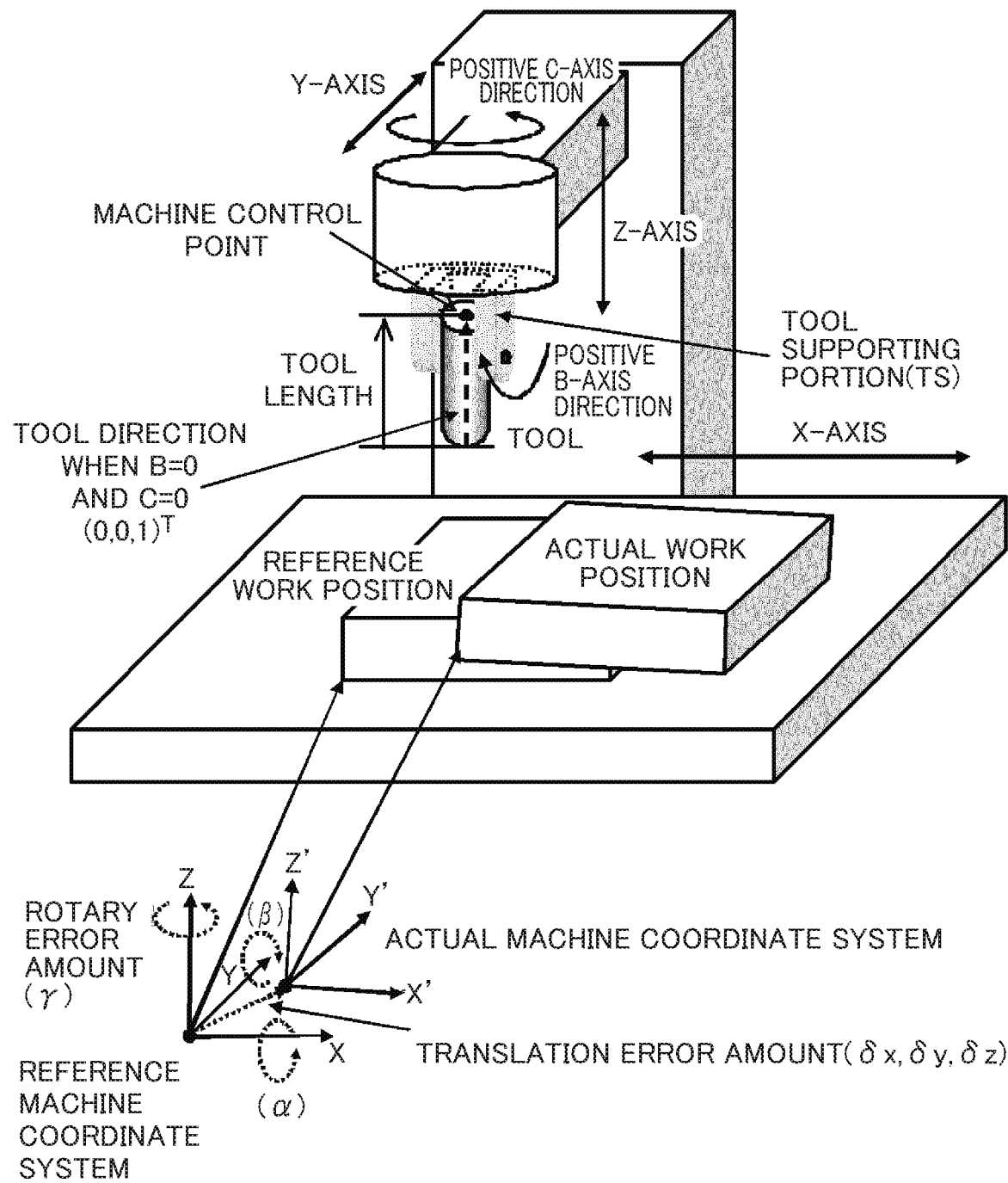
FIG. 1 is a diagram illustrating error compensation when a work that is to be placed at a reference work position is placed with an error like an actual work position in a tool-head-rotating five-axis machine tool.

Hereinafter, an example of an embodiment of the present invention will be described with reference to the accompanying drawings. The same or corresponding portions in the respective drawings will be denoted by the same reference numerals.

In the present embodiment, such a head-rotating five-axis machine tool as illustrated in FIG. 1 will be described. However, types of five-axis machine tools include a table rotating type and a mixed type in which a head as well as a table rotate. Although B and C-axes are the two rotary axes in FIG. 1, there are five-axis machine tools in which A and B-axes or A and C-axes are the two rotary axes. The present invention can be applied to these five-axis machine tools since these five-axis machine tools are similar in that a relative direction (a tool direction) of a tool with respect to a work is controlled.

In a numerical controller that controls a five-axis machine tool that machines a work (a workpiece) attached to a table using three linear axes and two rotary axes, a rotary axis at which a speed or an acceleration increases greatly near a singular point is referred to as a turning rotary axis and the other rotary axis is referred to as a tilting rotary axis. In a configuration of a head-rotating five-axis machine tool illustrated in FIG. 1, the B-axis is a tilting rotary axis and the C-axis is a turning rotary axis. When a tool direction is instructed as a Z-axis direction, B=0° and a C-axis position is arbitrary (indefinite). That is, the tool direction is the Z-axis direction when C=0° or C=180°. Therefore, a position at which the B-axis position is 0° is the singular point. However, it is not always true that the singular point is when the tilting rotary axis (B-axis) position is 0°. Depending on a machine configuration, another angle such as B=90° or B=180° may be a singular point. That is, in a machine configuration of FIG. 1 in which B=90°, the singular point is at a position at which the B-axis position is 90°. Furthermore, there are cases where the singular point is not B=0° or B=90°. In the following description, although in the state of FIG. 1, a position at which B=0° and the B-axis position is 0° is the singular point, it is not always true that a position at which the tilting rotary axis position is 0° is the singular point. The present embodiment relates to error compensation for such a machine tool as in FIG. 1 (in FIG. 1, C=90°) when a work that is to be placed at a reference work position as illustrated in FIG. 1 is placed with an error at an actual work position.

In this machine, a tool head rotates with the aid of the C and B-axes around the Z and Y-axes, respectively, with the movements of the linear axes X, Y, and Z. An actual work position shifts from an original work position due to a tilting of a table or a shift when a work was installed. The shift amount is measured in advance, and an actual machine coordinate system is set so as to be shifted with respect to a reference machine coordinate system by a translation error amount ($\delta x, \delta y, \delta z$) in the X, Y, and Z-axial directions, an X-axis rotary error amount ($\alpha$), a Y-axis rotary error amount ($\beta$), and a Z-axis rotary error amount ($\gamma$). That is, an actual machine coordinate system for a reference machine coordinate system is created according to the error amounts so that a reference work position on the reference machine coordinate system is equal to an actual work position on the actual machine coordinate system.

Patent Document 2 discloses a technology related to a method and a device for compensating an installation error of a workpiece. Patent Document 2 discloses means for compensating an installation error (an attachment error) of a work (a workpiece). This document discloses that a calculation which uses arctan is performed to obtain compensated B-axis and A-axis positions (for example, see Paragraphs 0043 and 0046). However, arctan generally has two solutions between 0° and 360°, and the compensated B-axis and A-axis positions are not determined by this calculation.

(First Method)

In light of this, as disclosed in Patent Document 3, for example, a solution close to a previous solution is selected generally. This method is referred to as a first method. However, the first method (a method of selecting a solution close to a previous solution) disclosed in Patent Document 3 has a problem that a command position as indicated by an ending position is not reached.

(Second Method)

Therefore, Patent Document 4 employs a method of selecting a solution close to a command rather than selecting a solution close to a previous solution. This method is referred to as a second method.

A technical idea of the second method (a method of selecting a solution close to a command) disclosed in Patent Document 4 will be described. The position and the direction on a command coordinate system (that is, a reference machine coordinate system) of a tool are calculated on the basis of a command value. A tool direction $(I,J,K)^T$ when B=Bc and C=Cc is calculated by Equation 1. This is the direction on a command coordinate system of a tool. Here, "T" is a symbol indicating transpose. Moreover, ( ) will be omitted for well-known expressions of trigonometric functions such as cos(Cc).

$$\begin{bmatrix} I \\ J \\ K \end{bmatrix} = \begin{bmatrix} \cos Cc & -\sin Cc & 0 \\ \sin Cc & \cos Cc & 0 \\ 0 & 0 & 1 \end{bmatrix} \begin{bmatrix} \cos Bc & 0 & \sin Bc \\ 0 & 1 & 0 \\ -\sin Bc & 0 & \cos Bc \end{bmatrix} \begin{bmatrix} 0 \\ 0 \\ 1 \end{bmatrix} = \begin{bmatrix} \cos Cc * \sin Bc \\ \sin Cc * \sin Bc \\ \cos Bc \end{bmatrix} \quad [\text{Math. 1}]$$

Since a program command is instructed on a reference machine coordinate system, the position on a command coordinate system of a tool is a program command (Xc, Yc, Zc) of the linear axes itself.

Next, error compensation is performed as in Equation 2. $(I,J,K)^T$ is compensated to $(Ia,Ja,Ka)^T$ by the X-axis rotary error amount ($\alpha$), the Y-axis rotary error amount ($\beta$), and the Z-axis rotary error amount ($\gamma$). Here, the rotary errors are compensated in the order of ($\alpha$), ($\beta$), and ($\gamma$).

$$\begin{bmatrix} Ia \\ Ja \\ Ka \end{bmatrix} = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix}$$
$$\begin{bmatrix} 1 & 0 & 0 \\ 0 & \cos\alpha & -\sin\alpha \\ 0 & \sin\alpha & \cos\alpha \end{bmatrix} \begin{bmatrix} I \\ J \\ K \end{bmatrix}$$
[Math. 2]

Similarly, $(Xc,Yc,Zc)^T$ is compensated to $(Xa,Ya,Za)^T$. In compensation of $(Xc,Yc,Zc)^T$, compensation of a translation error $(\delta x, \delta y, \delta z)$ is also added together with compensation of a rotary error (see Equation 3).

$$\begin{bmatrix} Xa \\ Ya \\ Za \end{bmatrix} = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix}$$
$$\begin{bmatrix} 1 & 0 & 0 \\ 0 & \cos\alpha & -\sin\alpha \\ 0 & \sin\alpha & \cos\alpha \end{bmatrix} \begin{bmatrix} Xc \\ Yc \\ Zc \end{bmatrix} + \begin{bmatrix} \delta x \\ \delta y \\ \delta z \end{bmatrix}$$
[Math. 3]

The B and C-axis positions Ba and Ca that realize $(Ia,Ja,Ka)^T$ calculated by Equation 2 are calculated as in Equations 4 to 20. Here, a calculation of arccos and a calculation of arctan both obtain a value between 0° and 180°. n in the term of n*360° in the calculation of arctan is an integer value and indicates that positions to which n multiples of 3600 are added are also solutions. That is, although the C-axis can operate even if the axis rotates arbitrary times in positive and negative directions, the B-axis can operate between −180° and 180°

1) Case of Ia>0 and Ja>0

Solution A $Ba_A = \arccos(Ka)$ [Math. 4]
$Ca_A = \arctan\frac{Ja}{Ia} + n*360°$ Solution B $Ba_B = -\arccos(Ka)$ [Math. 5]
$Ca_B = \arctan\frac{Ja}{Ia} + 180° + n*360°$ 2) Case of Ia<0 and Ja>0

Solution A $Ba_A = \arccos(Ka)$ [Math. 6]
$Ca_A = \arctan\frac{Ja}{Ia} + n*360°$ Solution B $Ba_B = -\arccos(Ka)$ [Math. 7]
$Ca_B = \arctan\frac{Ja}{Ia} + 180° + n*360°$ 3) Case of Ia<0 and Ja<0

Solution A $Ba_A = \arccos(Ka)$ [Math. 8]
$Ca_A = \arctan\frac{Ja}{Ia} + n*360°$ Solution B $Ba_B = -\arccos(Ka)$ [Math. 9]
$Ca_B = \arctan\frac{Ja}{Ia} + n*360°$ 4) Case of Ia>0 and Ja<0

Solution A $Ba_A = \arccos(Ka)$ [Math. 10]
$Ca_A = \arctan\frac{Ja}{Ia} + 180° + n*360°$ Solution B $Ba_B = -\arccos(Ka)$ [Math. 11]
$Ca_B = \arctan\frac{Ja}{Ia} + n*360°$ 5) Case of Ia=0 and Ja>0
Solution A $Ba_A = \arccos(Ka)$ $Ca_A = 90° + n*360°$ [Math. 12]

Solution B $Ba_B = -\arccos(Ka)$ $Ca_B = 270° + n*360°$ [Math. 13]

6) Case of Ia=0 and Ja<0
Solution A $Ba_A = \arccos(Ka)$ $Ca_A = 270° + n*360°$ [Math. 14]

Solution B $Ba_B = -\arccos(Ka)$ $Ca_B = 90° + n*360°$ [Math. 15]

7) Case of Ia>0 and Ja=0
Solution A $Ba_A = \arccos(Ka)$ $Ca_A = 0° + n*360°$ [Math. 16]

Solution B $Ba_B = \arccos(Ka)$ $Ca_B = 180° + n*360°$ [Math. 17]

8) Case of Ia<0 and Ja=0
Solution A $Ba_A = \arccos(Ka)$ $Ca_A = 180° + n*360°$ [Math. 18]

Solution B $$Ba_B = \arccos(Ka)$$

$$Ca_B = 0° + n*360° \quad \text{[Math. 19]}$$

9) Case of Ia=0, Ja=0, and Ka=1
Solution A Only $$Ba = 0°$$

$$Ca = Cc \quad \text{[Math. 20]}$$

The case of Ia=0, Ja=0, and Ka=−1 is not described because such a case does not occur in this machine structure.

Here, two sets of solutions of A and B are obtained for the cases 1), 2), 3), 4), 5), 6), 7), and 8), an amount D illustrated in Equation 21 is calculated for n and each set of solutions, and n and the set which minimizes D are selected. However, only one set of solutions is obtained for the case 9), and thus the solution of Equation 20 is selected.

$$D = (Bc - Ba)^2 + (Cc - Ca)^2 \quad \text{[Math. 21]}$$

In this way, a tool direction close to the direction on the command coordinate system of the tool calculated on the basis of the command values Bc and Cc is selected. This is the technical idea of the second method (a technology disclosed in Patent Document 4 which is a method of selecting a solution close to a command).

Here, a difference between the first method (a technology disclosed in Patent Document 3 which is a method of selecting a solution close to a previous solution) and the second method (a technology disclosed in Patent Document 4 which is a method of selecting a solution close to a command) will be described by way of a specific example.

Figure 2:
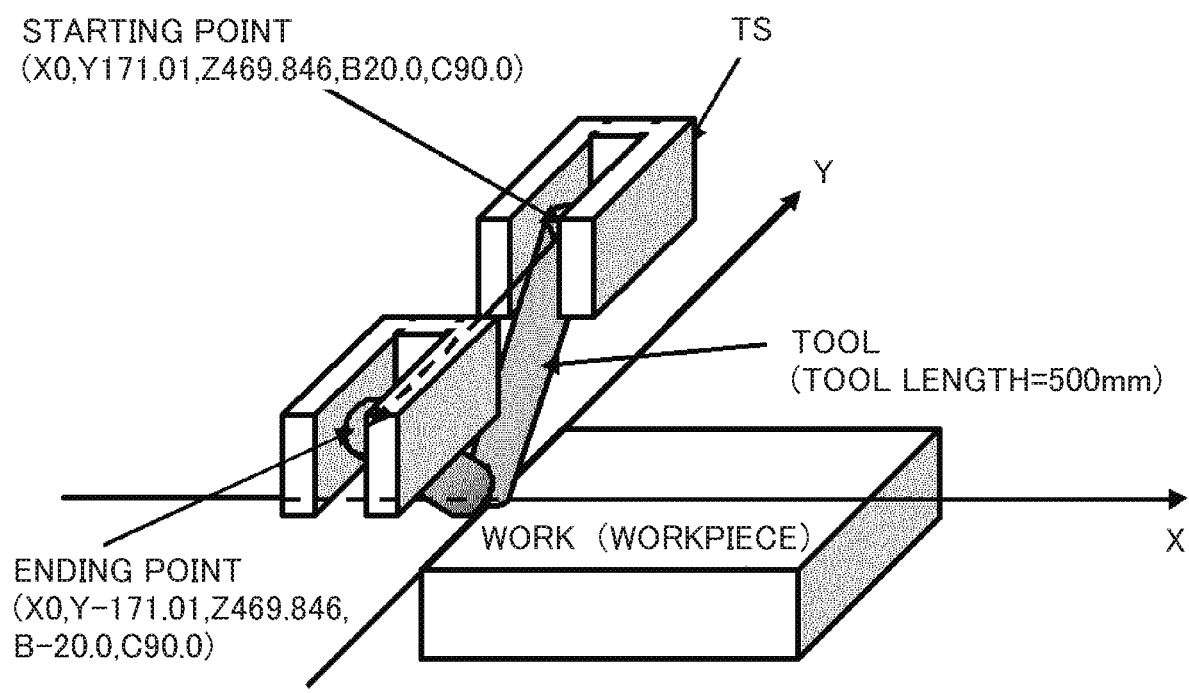
FIG. 2 is a diagram illustrating only a tool and a tool supporting portion (TS) of a head in a tool-head-rotating five-axis machine tool.

It is assumed that a command includes a starting point and an ending point as illustrated in FIG. 2. In the following drawings, a tool and a tool supporting portion (TS) of a head only are depicted. The shapes of TS and the tool are slightly changed to be depicted long so that the B and C-axis positions are easily visible. Furthermore, the example includes a tool length of 500 mm and a position of (X,Y,Z)=(0,0,0) that is machined. Although movement commands for X, Y, and Z-axes are not illustrated for simplicity's sake since the second method and the third method to be described later are characterized in rotary axis control, movement commands generally include rotary axis commands as well as linear axis commands and error compensation of Equation 3 is performed with respect to movement of linear axes.

Figure 3:
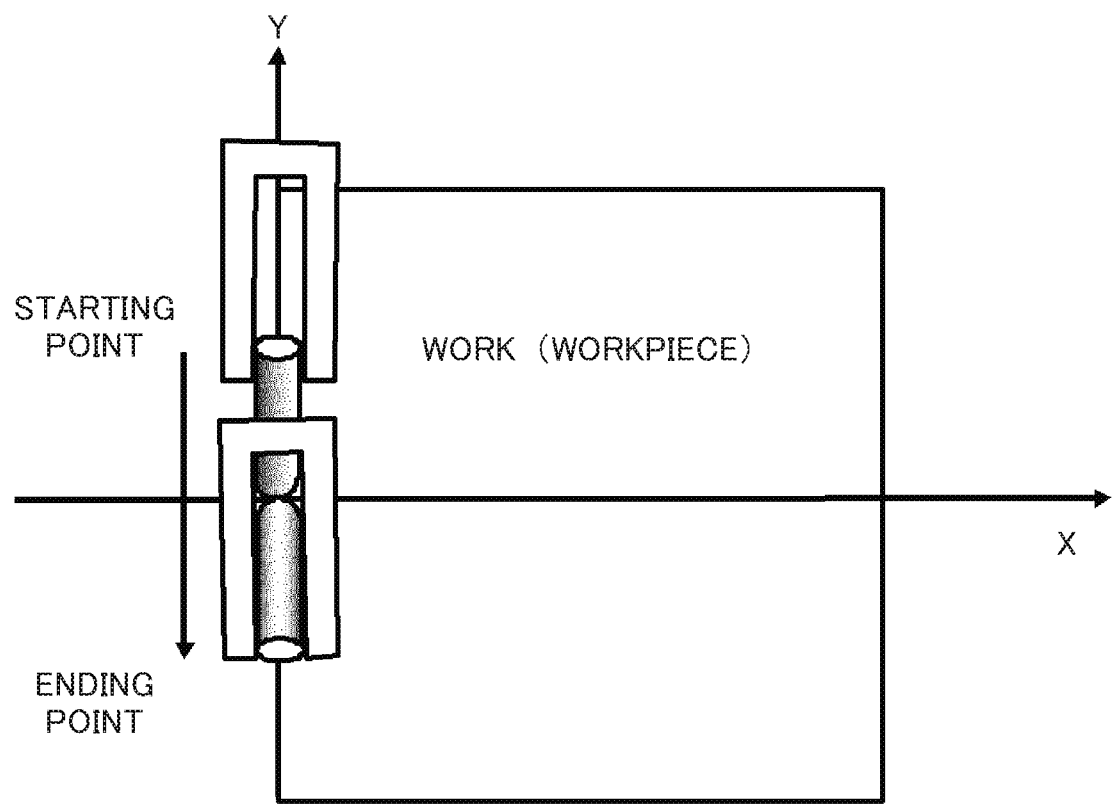
FIG. 3 is a top view of FIG. 2.
Figure 4:
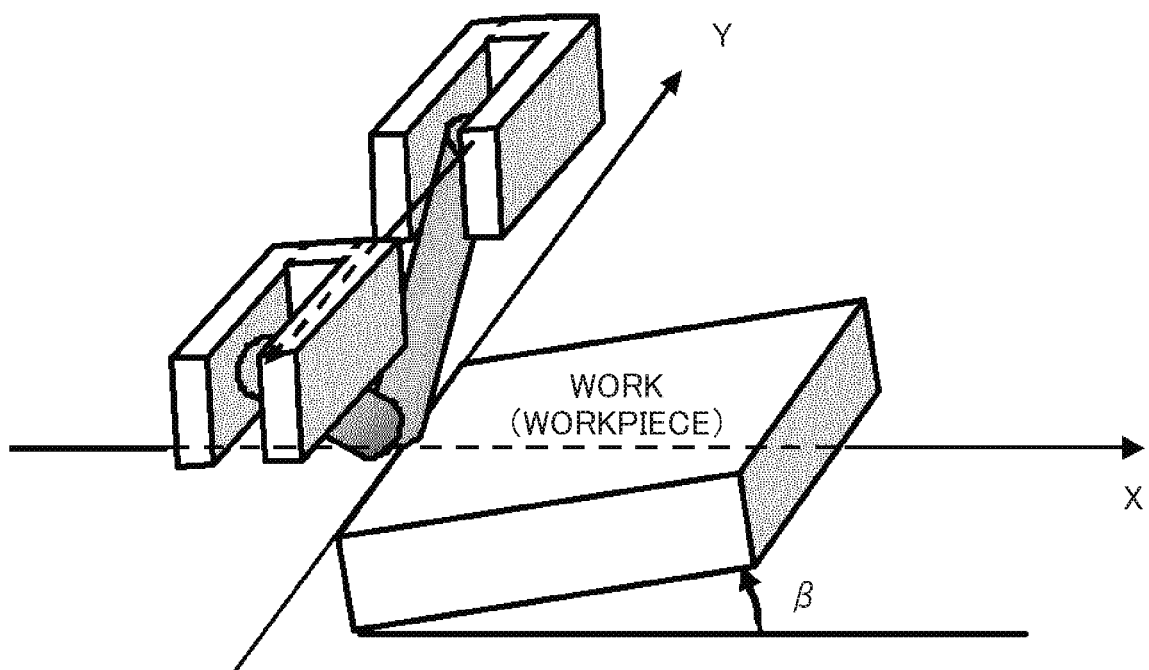
FIG. 4 is a diagram illustrating a case in which a small error (β) around a Y-axis is present in a work installation position.
Figure 5:
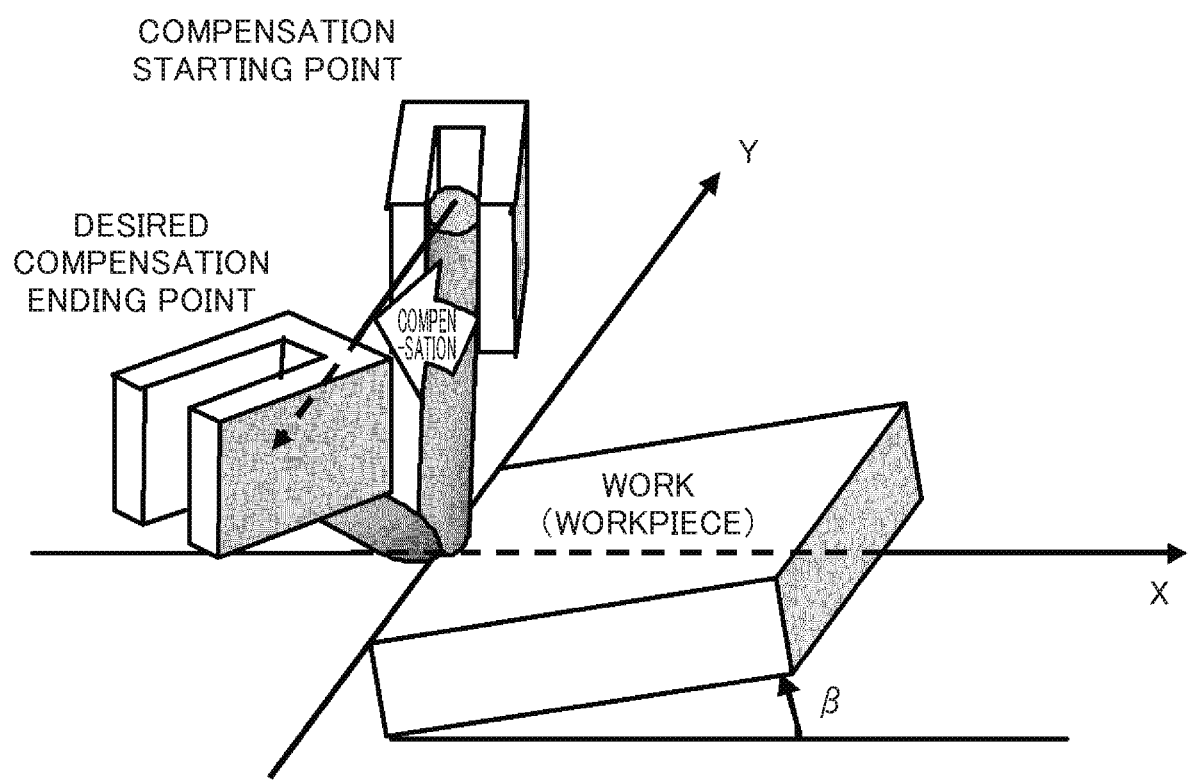
FIG. 5 is a diagram illustrating the movement of a tool showing only a starting point and an ending point when an error is compensated so that the tool position and direction in relation to a work are maintained.

FIG. 3 is a top view of FIG. 2. Here, it is assumed that a small error (R) around the Y-axis is present in a work installation position as illustrated in FIG. 4. Due to this, when the error is compensated so that the position and the direction of the tool with respect to the work are maintained, it is expected that the tool moves as illustrated in FIG. 5 when the starting point and the ending point only are depicted.

Figure 6:
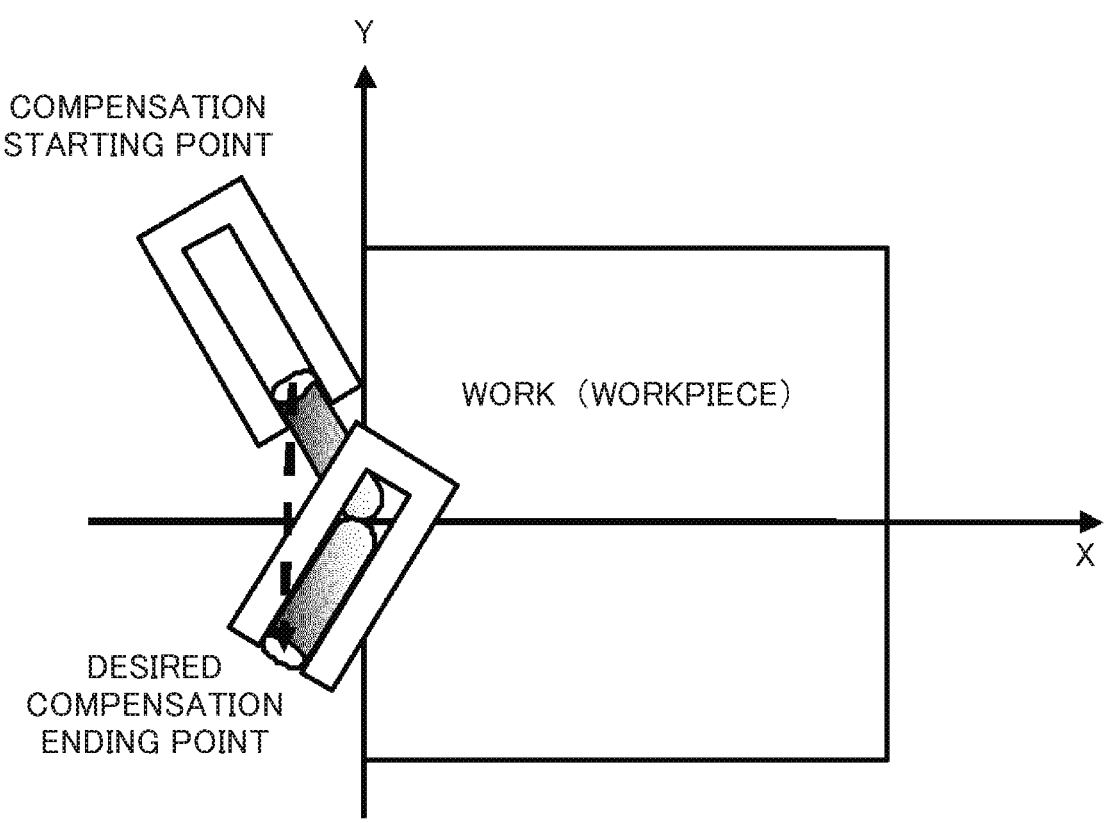
FIG. 6 is a top view of FIG. 5, illustrating only the starting point and the ending point.

That is, it is expected that the error is compensated as illustrated in FIG. 6 when the starting point and the ending point only are depicted in a top view. Hereinafter, for simplicity's sake, a top view rather than a perspective view will be used.

Figure 7:
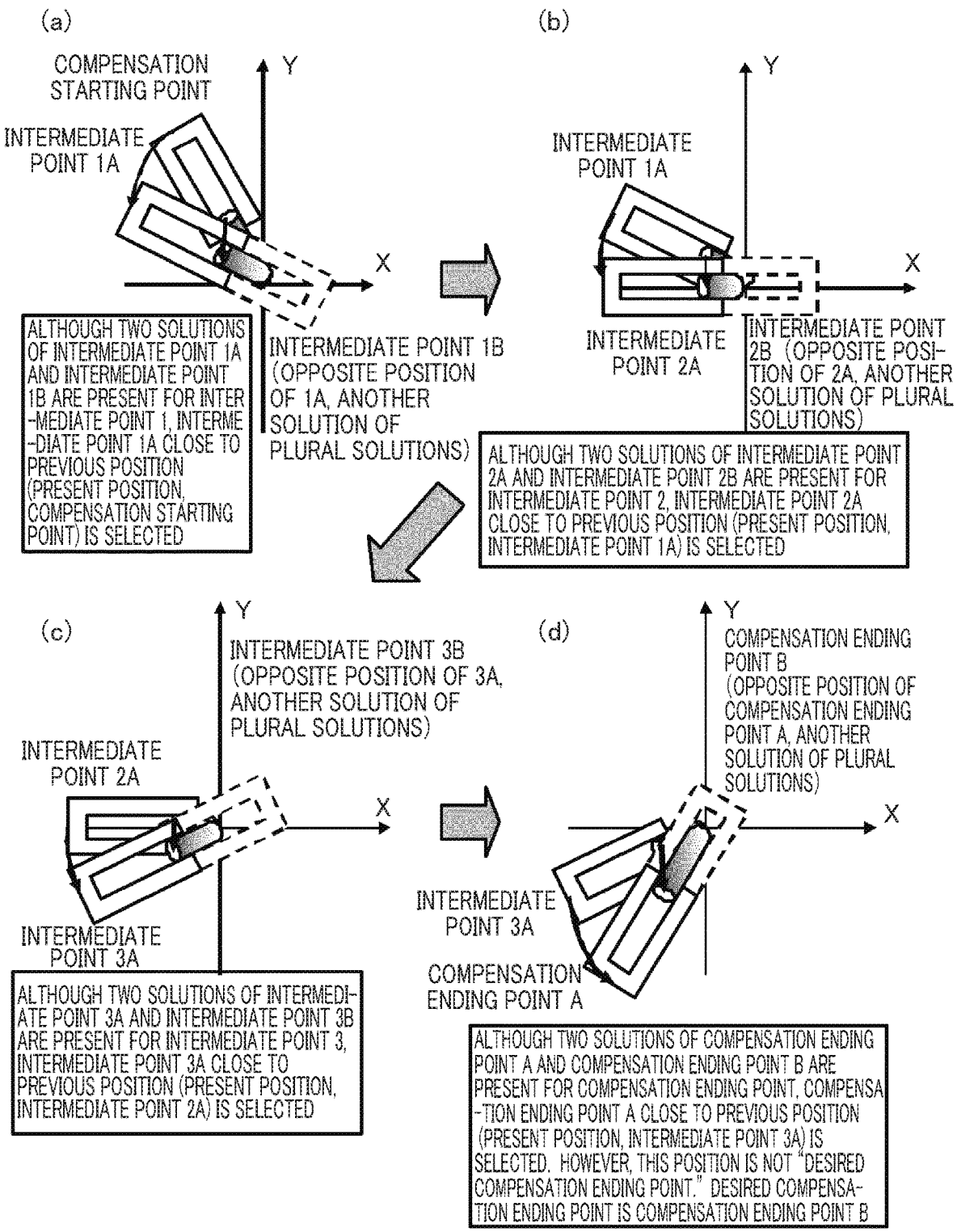
FIG. 7 is a diagram illustrating operations of a tool and a tool supporting portion (TS) in a first method (a method of selecting a solution close to a previous solution).

However, such an operation is not realized in the first method (a technology disclosed in Patent Document 3 which is a method of selecting a solution close to a previous solution) as illustrated in FIG. 7. Here, it is assumed that the tool is already at a compensation starting point by the compensation of a previous block. Moreover, two solutions of A and B at each position such as an intermediate point 1A and an intermediate point 1B correspond to solutions A and B in the cases of 1) to 8). Here, ** means an intermediate point 1, an intermediate point 2, an intermediate point 3, and a compensation ending point.

A compensation ending point in (d) of FIG. 7 is at an opposite position of a "desired compensation ending point" in FIG. 6. That is, the B and C-axis positions at the ending point greatly deviate from the original command positions. This means that an operation error or a cutting error may occur in machining which reaches the ending point or subsequent machining or the tool may collide with an obstacle.

Figure 8:
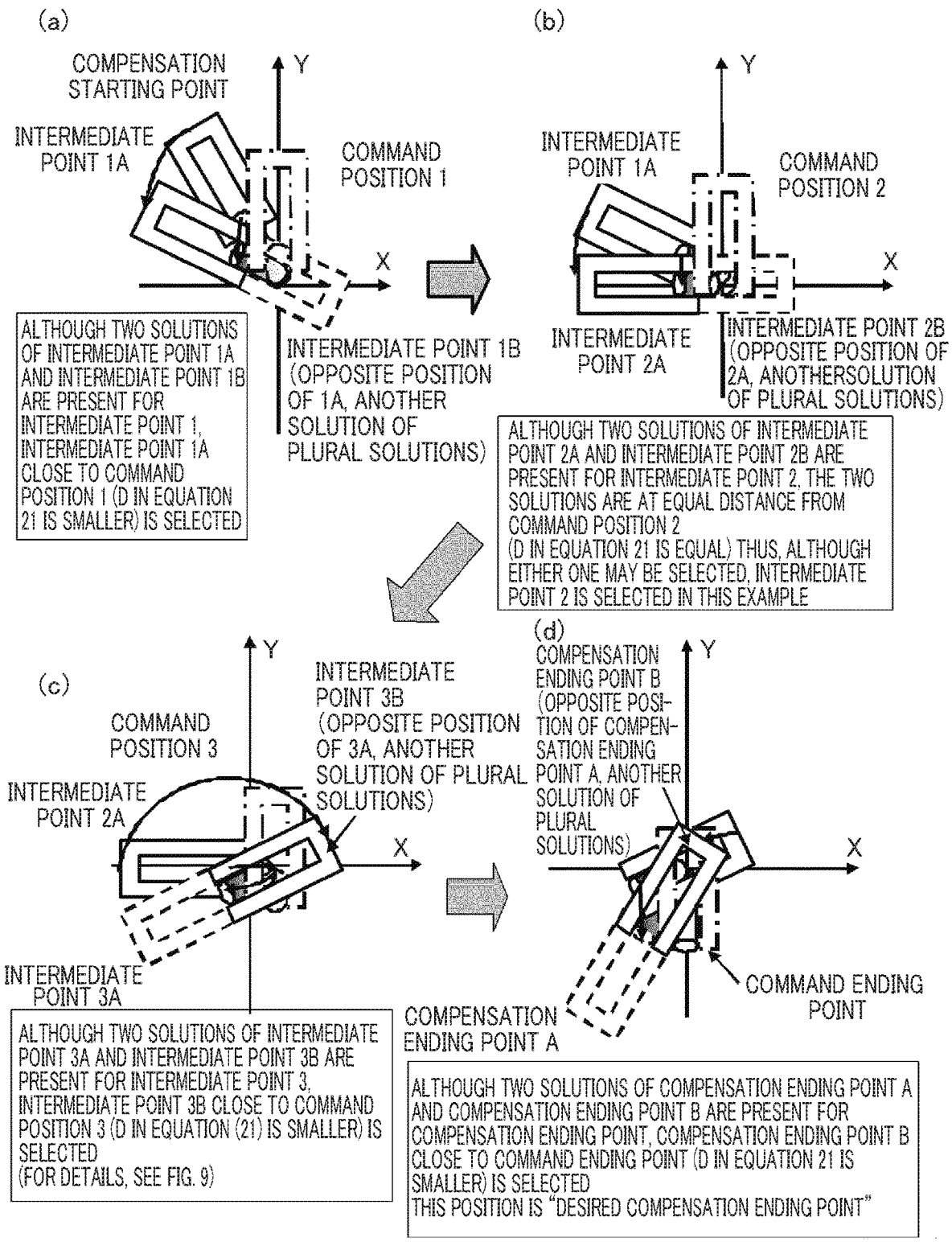
FIG. 8 is a diagram illustrating operations of a tool and a tool supporting portion (TS) in a second method (a method of selecting a solution close to a command).

Such a problem is solved by the second method (a technology disclosed in Patent Document 4 which is a method of selecting a solution close to a command) as illustrated in FIG. 8. In this method, a case in which Solution A is closer to a command path than Solution B until Intermediate point 1 is reached whereas Solution B is closer to the command path than Solution A after Intermediate point 3 is passed through. Naturally, a reverse case may occur.

Command positions 1, 2, and 3 and the command ending point in FIG. 8 are positions in the course of moving from an instructed starting point to an ending point in FIGS. 2 and 3 and the position of the ending point. The positions at which a work installation error is compensated for a command position n and a command ending point are an intermediate point n and a compensation ending point. That is, the compensation positions for the command positions 1, 2, and 3 and the command ending point are Intermediate points 1, 2, and 3 and a compensation ending point.

A compensation ending point in (d) of FIG. 8 is a "desired compensation ending point" in FIG. 6. In this way, the problem of the first method (a method of selecting a solution close to a previous solution) is solved by the second method (a method of selecting a solution close to a command). That is, the second method (a method of selecting a solution close to a command) has a remarkable effect that it is possible to reach a desired (expected) compensation ending point.

Figure 9:
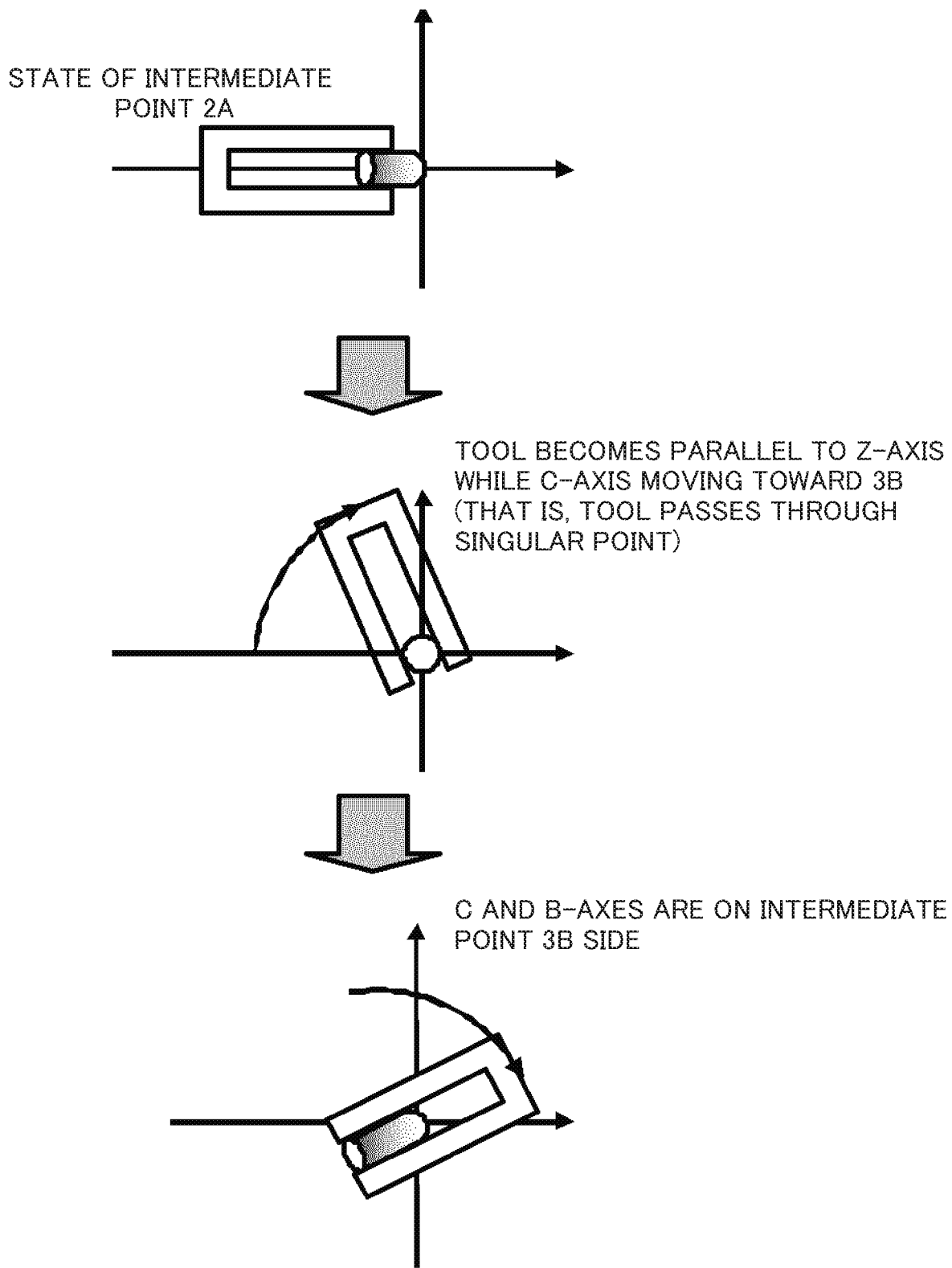
FIG. 9 is a diagram illustrating an example in which it is not desirable that a large movement (close to 180°) occurs in a turning rotary axis (C-axis).
Figure 10:
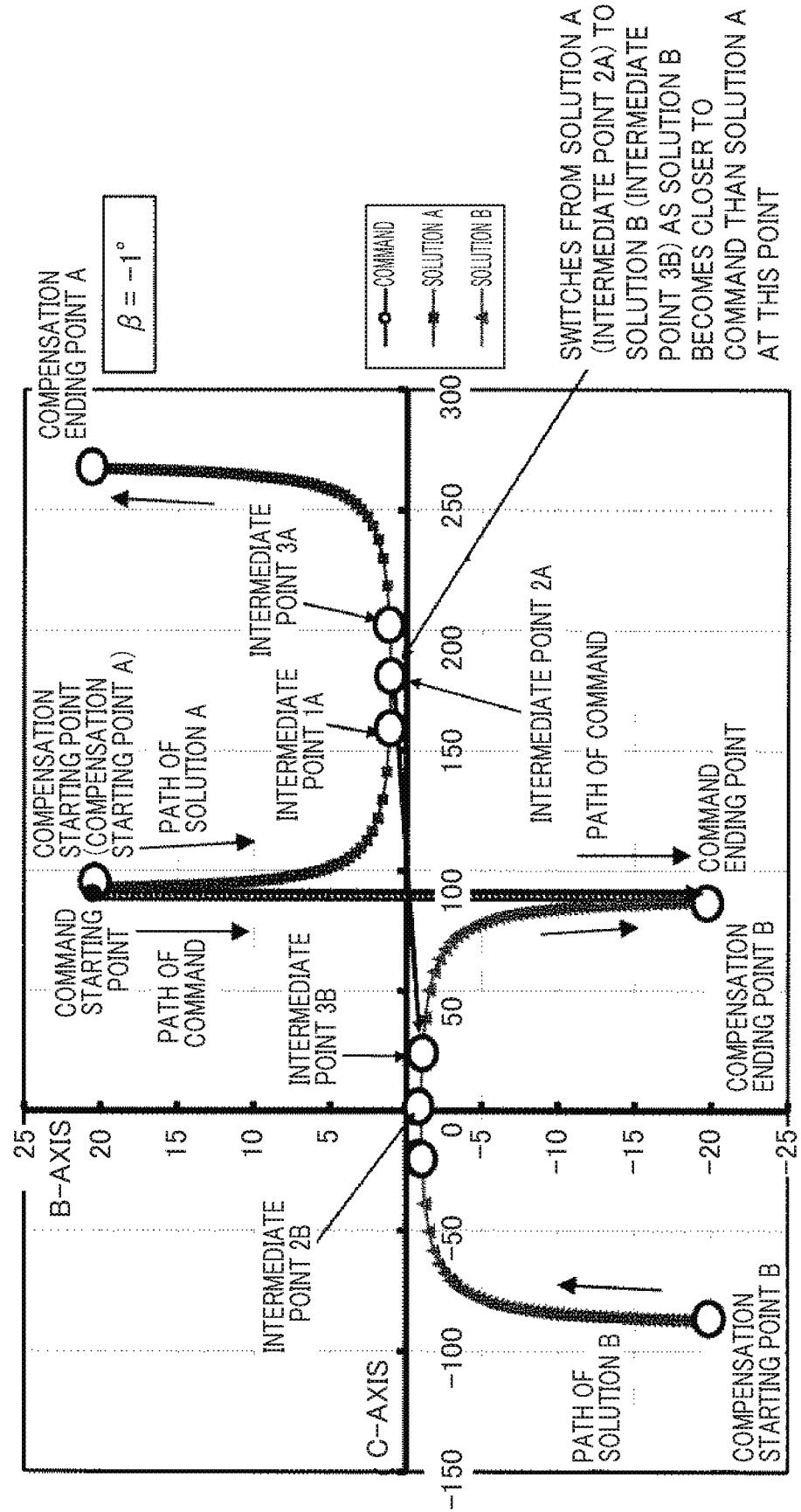
FIG. 10 is a diagram illustrating the movement in FIGS. 8 and 9 when β=−1° using a path in which B and C-axes are used as coordinate axes.

However, as illustrated in (c) of FIG. 8 and FIG. 9, occurrence of a large movement (close to 180°) in a turning rotary axis (the C-axis) is not desirable. This is represented in FIG. 10 when represented on a path in which the B and C-axes when β=−1° are used as coordinate axes.

For a command including a command starting point (B=−20° and C=90°) and a command ending point (B=20° and C=90°), a path starts from a compensation starting point (compensation starting point A) and Solution A is selected since Solution A is close to the command up to Intermediate point 2A, and Solution B (Intermediate point 3B) close to the command is selected at Intermediate point 3 whereby the path moves from Intermediate point 2A to Intermediate point 3B. After switching to Intermediate point 3B, Solution B is selected and the path moves toward Compensation ending point B and finally reaches Compensation ending point B. As described above, although the second method (a method of selecting a solution close to a command) has a remarkable effect that it is possible to reach a desired (expected) compensation ending point, a large movement (close to 1800) of the turning rotary axis (C-axis) is not desirable.

Figure 11:
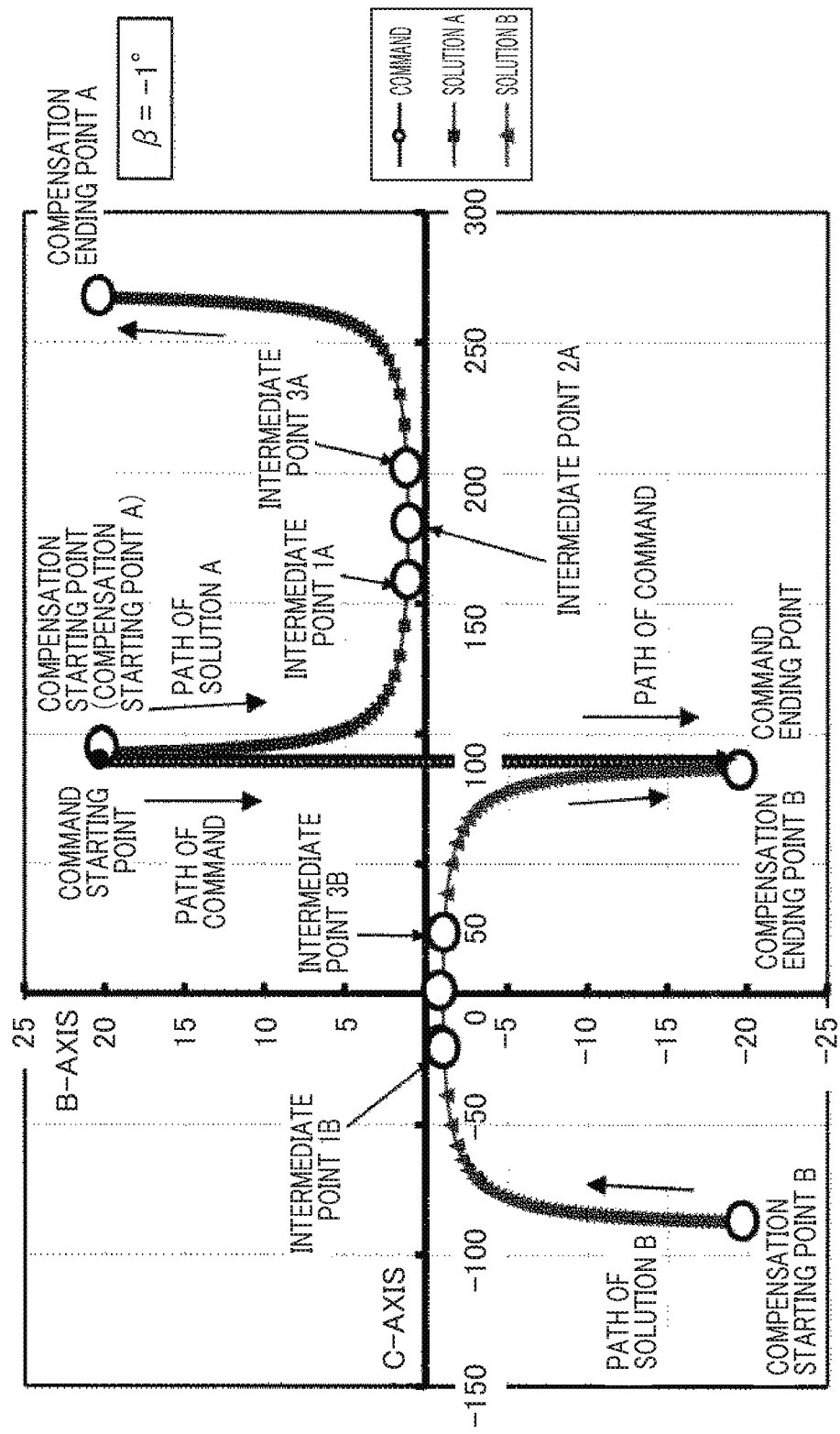
FIG. 11 is a diagram illustrating the movement using a path in which B and C-axes are used as coordinate axes in the first method (a method of selecting a solution close to a previous solution). (that is, a diagram illustrating the movement in FIG. 7 when β=−1° using a path in which B and C-axes are used as coordinate axes)

In the first method (a method of selecting a solution close to a previous solution), the movement is represented in FIG. 11 when represented on a path in which the B and C-axes are similarly used as coordinate axes. Since the path starts from a compensation starting point (Compensation starting point A) and the path of Solution A is always close to a previous solution, Solution A is selected, and Compensation ending point A is finally reached. From this, it can be understood that in the first method (a method of selecting a solution close to a previous solution), the path reaches Compensation ending point A that is greatly separated from a command ending point. That is, in the first method, the path reaches Compensation ending point A rather than Compensation ending point B that is to be reached.

(Third Method)

In order to prevent a large movement (close to 1800) in the turning rotary axis (C-axis) as in the second method, Patent Document 5 employs a method of switching to another solution at a timing at which the movement of the two rotary axes is minimized while selecting a solution close to a previous solution. This method is referred to as a third method.

A technical idea of the third method (a method of switching to another solution at a timing at which the movement of the two rotary axes is minimized while selecting a solution close to a previous solution) disclosed in Patent Document 5 will be described. In the third method, the path moves linearly from Solution A to Solution B when Solution A approaches closest to Ps (a singular point on a command path).

It is assumed that a program command is a linear interpolation command that includes a command starting point (B=−20°, C=90°) and a command ending point (B=20°, C=90°) Since a singular point is at B=0, an intersection between a straight line of B=0 and a straight line connecting the command starting point (B=−20°, C=90°) and the command ending point (B=20°, C=90°) is Ps (a singular point on a command path). That is, Ps(Bs,Cs)=(0,0). Here, Bs and Cs are B and C-axis elements of Ps. Here, determination on passing through a singular point will be described. When the sign of a tilting rotary axis (B-axis) command among two rotary axes is inverted between the two command positions of the command starting point and the command ending point, it is determined that the tilting rotary axis command is on opposite sides across the singular point between these commands and that the tilting rotary axis command needs to pass through the singular point. In the above-mentioned commands, since B=−20° at the command starting point and B=20° at the command ending point and the sign of the tilting rotary axis command is inverted, it is determined that the B-axis command is on opposite sides across the singular point between the starting point and the ending point and that B-axis command needs to pass through the singular point. It is regarded that, when the B-axis command is 0°, the sign of a previous command is maintained. For example, when B=−20° at the command starting point and B=0° at the command ending point, it is not regarded that the command starting point and the command ending point are on opposite sides across the singular point. However, the above description relates to a case where the singular point is at B=0°, and as described above, there is a machine configuration as illustrated in FIG. 1 in which B=90°. Furthermore, there are cases where the singular point is not B=0° or B=90°. In such a five-axis machine tool, it is observed whether the signs of ((Command starting point)-(Singular point)) and ((Command ending point)-(Singular point)) for the tilting rotary axis (B-axis) will be inverted or not. That is, when the signs of ((Command starting point)-(Singular point)) and ((Command ending point)-(Singular point)) for the tilting rotary axis (B-axis) are inverted, it is determined that the tilting rotary axis command is on opposite sides across the singular point and that the tilting rotary axis command needs to pass through the singular point. As described above, as for the tilting rotary axis (B-axis), in a case of a command toward the singular point, it is not regarded that the starting point and the ending point are on opposite sides across the singular point.

Figure 12:
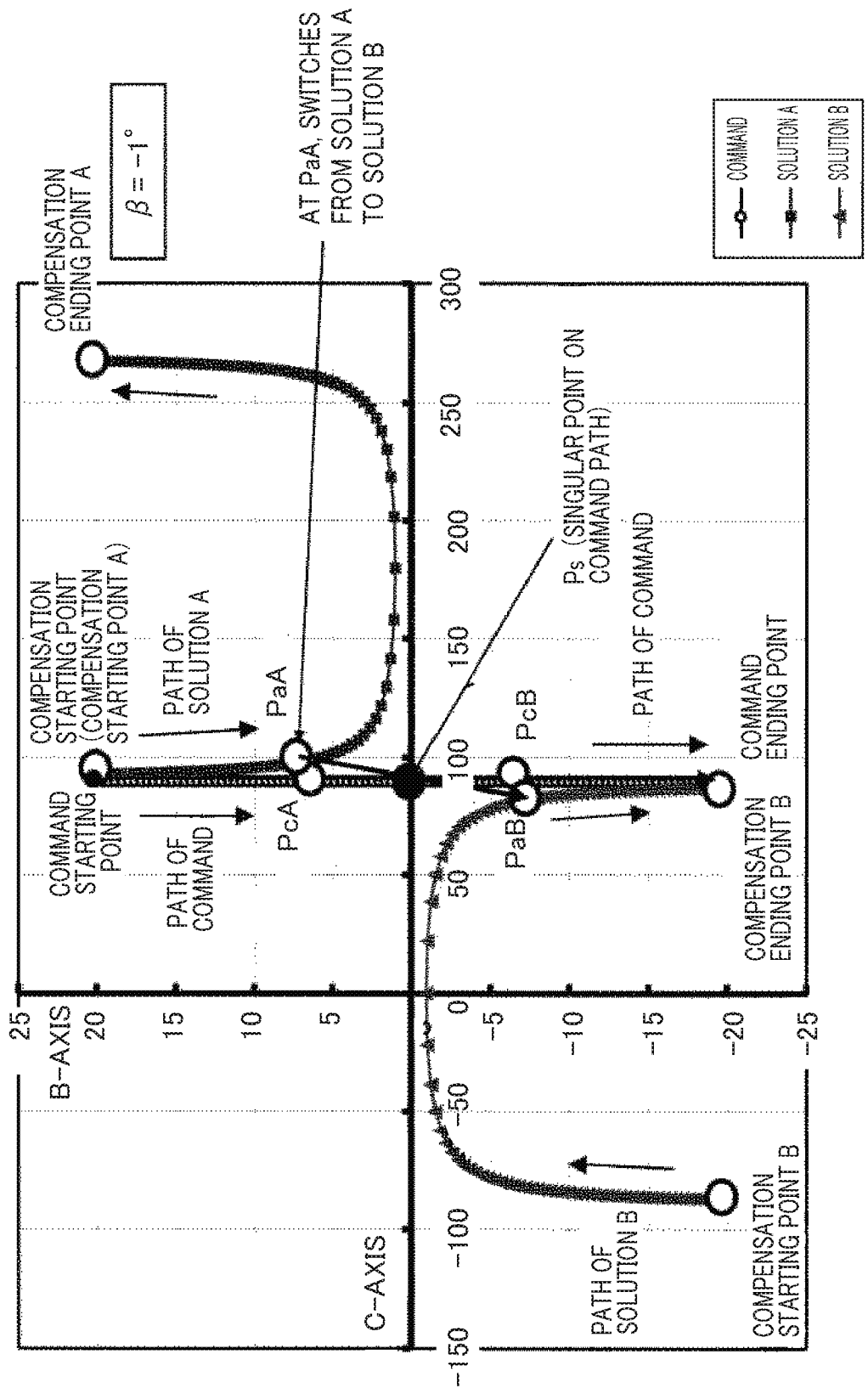
FIG. 12 is a diagram illustrating that, when Solution A approaches Ps (a singular point on a command path), Solution A moves linearly to Solution B in a third method (a method of switching to another solution at a timing at which the movement of the two rotary axes is minimized while selecting a solution close to a previous solution).

In FIG. 12, when error compensation is performed on a linear interpolation command including a command starting point (B=−20°, C=90°) and a command ending point (B=20°, C=90°), since the path starts from a compensation starting point (Compensation starting point A) and the distance between Ps and Solution A is minimized at PaA, linear interpolation from Solution A to PaB of Solution B is performed to switch the solution. Here, PaA is a solution switching starting position, PcA is a point on a command path corresponding to PaA, PcB is a point symmetric to PcA about Ps, and PaB is the position of Solution B due to PcB. After that, Solution B is selected, and the path moves toward Compensation ending point B and finally reaches Compensation ending point B. Although PaA on the path of Solution A does not appear to be the point closest to Ps in FIG. 12, PaA is the point closest to Ps when the scales of the B and C-axes are matched. As mentioned above, in this example, a case is described in which Solution A is closer to the command path than Solution B until the solution is switched and Solution B is closer to the command path after the solution is switched. Naturally, the reverse case may occur.

FIG. 13 illustrates specific interpolation data. In FIG. 13, R is set to −1° and an angular change ($\Delta_\tau$) is set to 0.4° at each interpolation period for a linear interpolation command including a command starting point (B=−20°, C=90°) and a command ending point (B=20°, C=90°). Therefore, the command is interpolated by $\Delta_\tau$ (0.40) from No. 0 (interpolation data at the command starting point) to No. 100 (interpolation data at the command ending point). This corresponds to a speed of 24000°/min when the interpolation period is 1 msec.

Interpolation of each row and error compensation calculation in FIG. 13 are performed as follows. Bc and Cc are pieces of data which are interpolated by $\Delta_\tau$ (0.40) from the command starting point to the command ending point in relation to the B and C-axes. In this example, only Bc changes. Error compensation calculation is performed for Bc and Cc interpolated in each interpolation period. That is, (I,J,K) is calculated by Equation 1. (Ia,Ja,Ka) is calculated from (I,J,K) by Equation 2. Solution A (BaA,CaA) and Solution B (BaB,CaB) are calculated from (Ia,Ja,Ka) by Equations 4 to 20.

Therefore, Solution A (BaA,CaA) is Compensation starting point A and Solution B (BaB,CaB) is Compensation starting point B for No. 0, and Solution A (BaA,CaA) is Compensation ending point A and Solution B (BaB,CaB) is Compensation ending point B for No. 100. Bc and Cc are obtained by calculation of interpolation, Solutions A and B are obtained from these results by calculation of error compensation. Here, when interpolation and error compensation calculation are performed sequentially from No. 1, change in the distance (L0) between Ps and Solution A (BaA,CaA) is checked. The distance (L0) is calculated by Equation 22.

$$L0=\sqrt{(Bc-Bs)^2+(Cc-Cs)^2} \qquad \text{[Math. 22]}$$

Since checking the change in the distance (L0) between Ps and Solution A (BaA,CaA) is equivalent to checking change in the square thereof, a value L represented by Equation 23 is checked in FIG. 13.

$$L=L0^2=(Bc-Bs)^2+(Cc-Cs)^2 \qquad \text{[Math. 23]}$$

Although the value L decreases monotonously in the order of No. 1, No. 2, and so on, the value L changes to increase from No. 31 and 32 (see the portion with a gray background in FIG. 13). Therefore, it is determined that the value L is the smallest at No. 31. If there is a possibility that it is erroneously determined that the value changes to increase due to a calculation error, another several temporary interpolations may be performed and then it may be determined that the decreasing value has changed to increasing. Therefore, (Bc,Cc) in No. 31 is PcA and Solution A is PaA (that is a position closest to the singular point and a solution switching starting position).

Here, a weight such as a and R may be applied to respective terms as illustrated in Equation 24 as the distance between Ps and Solution A (BaA,CaA).

$$L1 = \sqrt{\alpha*(Bc-Bs)^2 + \beta*(Cc-Cs)^2} \quad \text{[Math. 24]}$$

Alternatively, as illustrated in Equation 25, the sum of the absolute values between Ps and BaA,CaA may be calculated.

$$L2 = |Bc-Bs| + |Cc-Cs| \quad \text{[Math. 25]}$$

PcB is a point symmetric to PcA about Ps on the B and C-axis coordinate system, and PaB is Solution B obtained by performing error compensation calculation with respect to PcB. That is, PcB is calculated as in Equation 26 and error compensation calculation for No. 69 in FIG. 13 is performed with respect to PcB to obtain PaB.

$$PcB = -(PcA - Ps) + Ps \quad \text{[Math. 26]}$$

Linear interpolation is performed from PaA toward PaB. The speed of linear interpolation may be $\Delta_\tau$ (0.4°) for each interpolation period, a change rate of Solution A per interpolation period from the interpolation period of No. 31 to the interpolation period of No. 32 may be used, and a speed to which a separate parameter is set may be used. In this example, it is assumed that linear interpolation from PaA to PaB is performed at an original interpolation interval.

The number of interpolations and error calculations necessary for reaching from PcA to Ps is expressed by Equation 27. In Equation 27, the numerator on the right side is the distance between Ps and PcA on the B and C-axes. That is, Ni is the number of interpolations and error calculations necessary for reaching from PcA to Ps in the interpolation and error calculation in FIG. 13.

$$Ni = \frac{|PcA - Ps|}{\Delta\tau} \quad \text{[Math. 27]}$$

As described above in FIG. 2, commands generally include rotary axis commands and linear axis commands, and error compensation of Equation 3 is performed with respect to movement of linear axes. Although only interpolation and error calculation of the rotary axis are illustrated in FIG. 13, each row generally includes interpolation and error compensation calculation of the linear axis similarly, and the number of interpolations and error calculations necessary for reaching from PcA to Ps is Ni.

Therefore, when the number of interpolations necessary for reaching from PaA to PaB is 2*Ni, it is possible to perform interpolation and error compensation calculation for the linear axis as usual simultaneously performing the linear interpolation for the rotary axis from PaA toward PaB.

An interpolation point PaI of No. (31+N) (N=1, 2, . . . , 2*Ni) is calculated by Equation 28 from PaA toward PaB on the B and C-axes to perform interpolation. PaI(Ba,Ca) corresponds to the B and C-axes and has the elements of Ba and Ca.

$$PaI = \frac{N}{2*Ni}(PaB - PaA) + PaA \quad \text{[Math. 28]}$$

After linear interpolation from PaA to PaB ends, interpolation and error compensation calculation is performed from an interpolation period of No. 70 corresponding to the next interpolation period following PcB toward No. 100 of the command ending point and Solution B is selected. In this manner, Compensation ending point B is reached.

Figure 14:
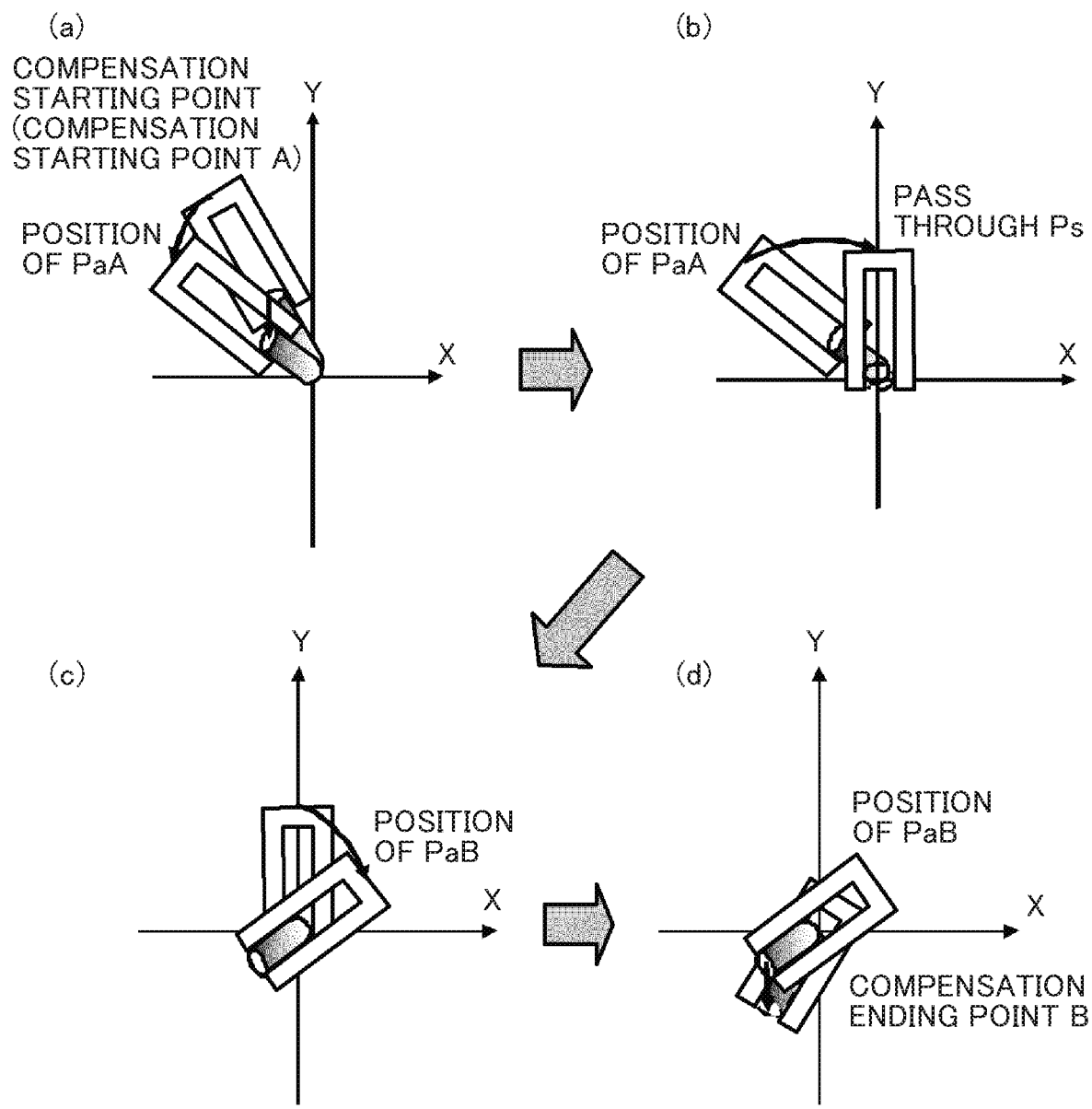
FIG. 14 is a diagram illustrating the movement of a rotary axis corresponding to FIG. 8 in the third method illustrated in FIGS. 12 and 13.
Figure 15:
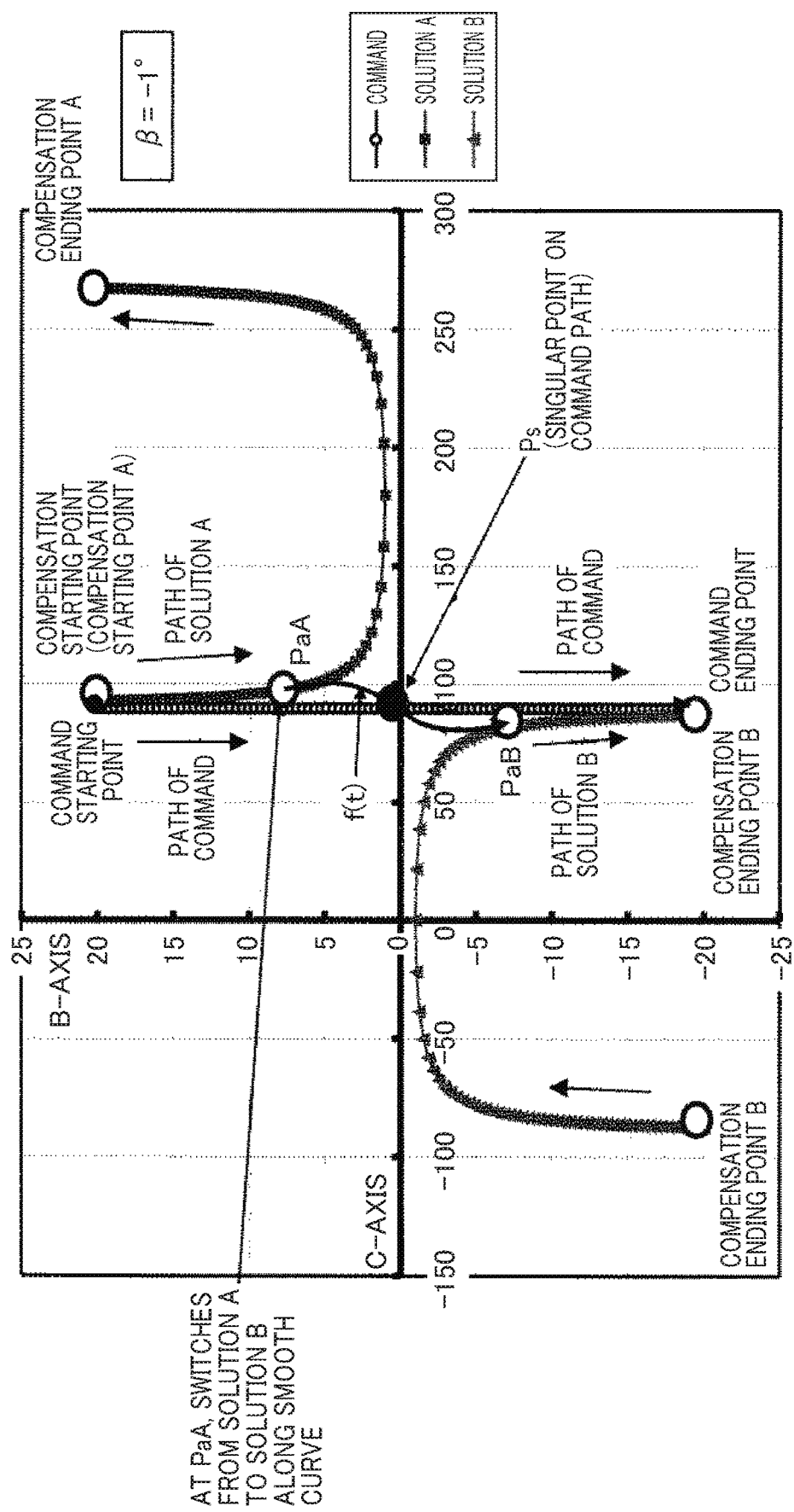
FIG. 15 is a diagram illustrating that, when Solution A approaches a singular point on a command path in a third method, Solution A moves smoothly to Solution B along a curve.

FIG. 14 illustrates the movement of a rotary axis corresponding to FIG. 8. A large movement ((c) in FIG. 8) of the rotary axis from Intermediate point 2A to Intermediate point 3B in FIG. 8 has slightly decreased from (b) to (c) in FIG. 14. Since FIG. 8 is a diagram in which it is assumed that the error is large ((is approximately −15°) for better understanding of the aspect of error compensation, it appears that the difference between FIGS. 8 and 14 is not too great. However, the error is generally a little smaller (II is 1° or smaller and is generally further smaller at 0.10 or smaller). In this case, although a movement of the rotary axis close to 1800 is inevitable in FIG. 8, the movement of the rotary axis from (b) to (c) in FIG. 14 is very small.

In the third method, movement may be made from Solution A to Solution B along a smooth curve as Solution A approaches closest to the singular point on a command path. A program command is the same as described above. Therefore, Ps is the same. However, switching from PaA toward PaB is performed along a curve. After that, Solution B is selected and the path moves toward Compensation ending point B and finally reaches Compensation ending point B. Here, a curve is created so that a tangential direction at PaA of the path of Solution A and a tangential direction at PaB of the path of Solution B are connected smoothly.

FIG. 16 illustrates specific interpolation data. FIG. 16 is substantially the same as FIG. 13 and the description of the same portion will be omitted. A difference is that data is interpolated from PaA toward PaB along a curve. The following method may be used as a curve interpolation method. Solution A one interpolation period before, of the interpolation period of PaA, is defined as PmA. A speed PaA' at PaA is calculated by Equation 29.

$$PaA' = \frac{PaA - PmA}{\Delta\tau} \quad \text{[Math. 29]}$$

Equation 30 which is a quadratic function may be derived from three conditions that a curve passes through PaA and Ps and the speed (a tangential vector) at PaA is PaA', and data may be interpolated from PaA to Ps. Here, the quadratic function f(t) (t=0→1) and the coefficients ω, δ, and ε are vectors having the elements of B and C.

$$f(t) = \omega*t^2 + \delta*t + \varepsilon \quad \text{[Math. 30]}$$

A function (f1(t)) (t=1→0) represented by Equation 31 which is point-symmetric about Ps with respect to f(t) is calculated and interpolated, whereby data can be similarly interpolated from Ps to PaB.

$$f1(t) = -(\omega*t^2 + \delta*t + \varepsilon - Ps) + Ps \quad \text{[Math. 31]}$$

Alternatively, a cubic curve g(t) represented by Equation 32 may be derived from four conditions that a curve passes through PaA and PaB, the speed (a tangential vector) at PaA is PaA', and the speed (a tangential vector) at PaB is PaB' which is point-symmetric about Ps with respect to PaA', and data may be interpolated from PaA to PaB. Here, the cubic function g(t) and the coefficients η, λ, μ, and σ are vectors having the elements of B and C.

$$g(t) = \eta * t^3 + \delta * t^2 + \mu * t + \sigma \qquad \text{[Math. 32]}$$

Figure 17:
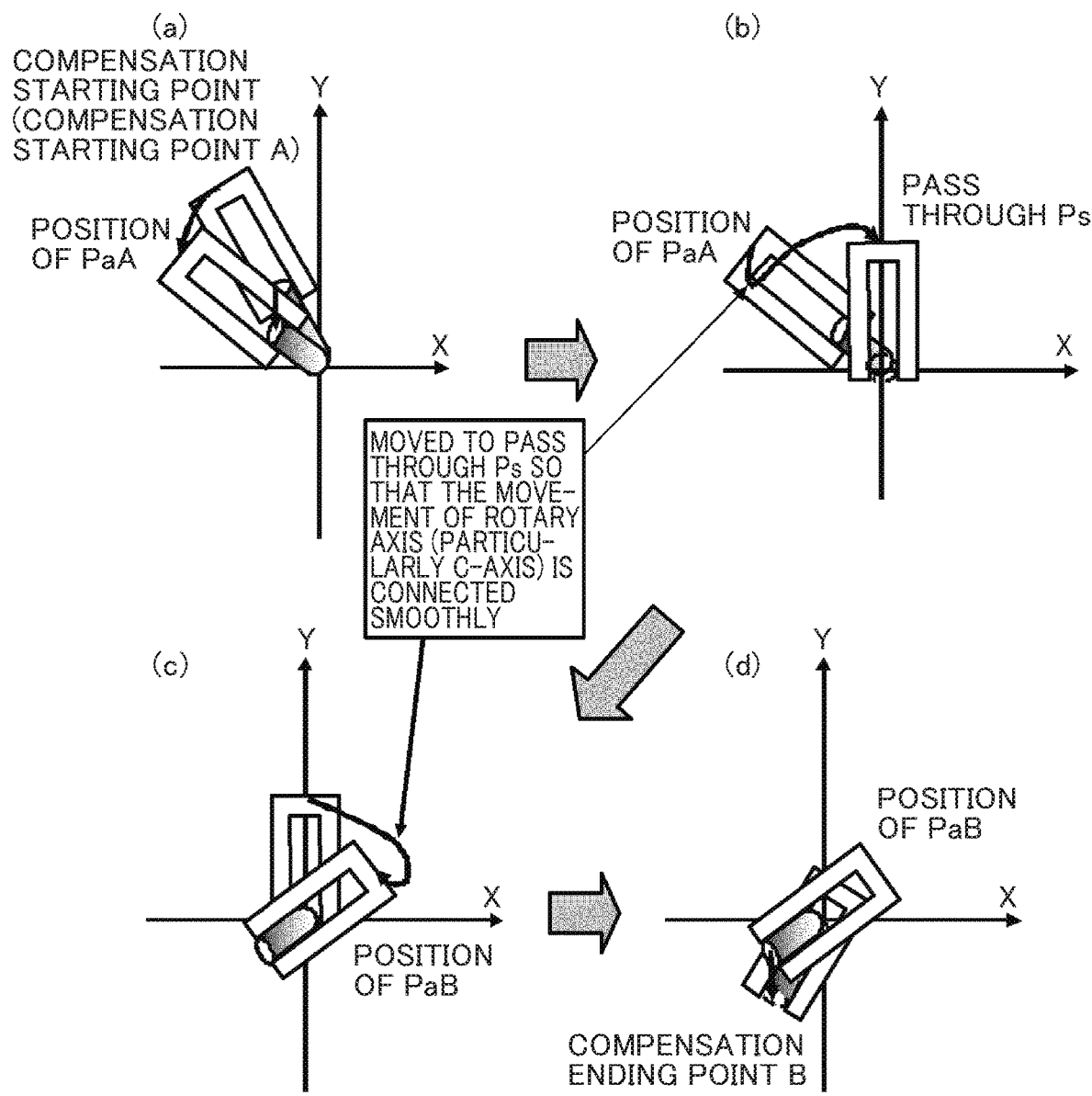
FIG. 17 is a diagram illustrating the movement of a rotary axis corresponding to FIG. 8 in the third method illustrated in FIGS. 15 and 16.
Figure 18:
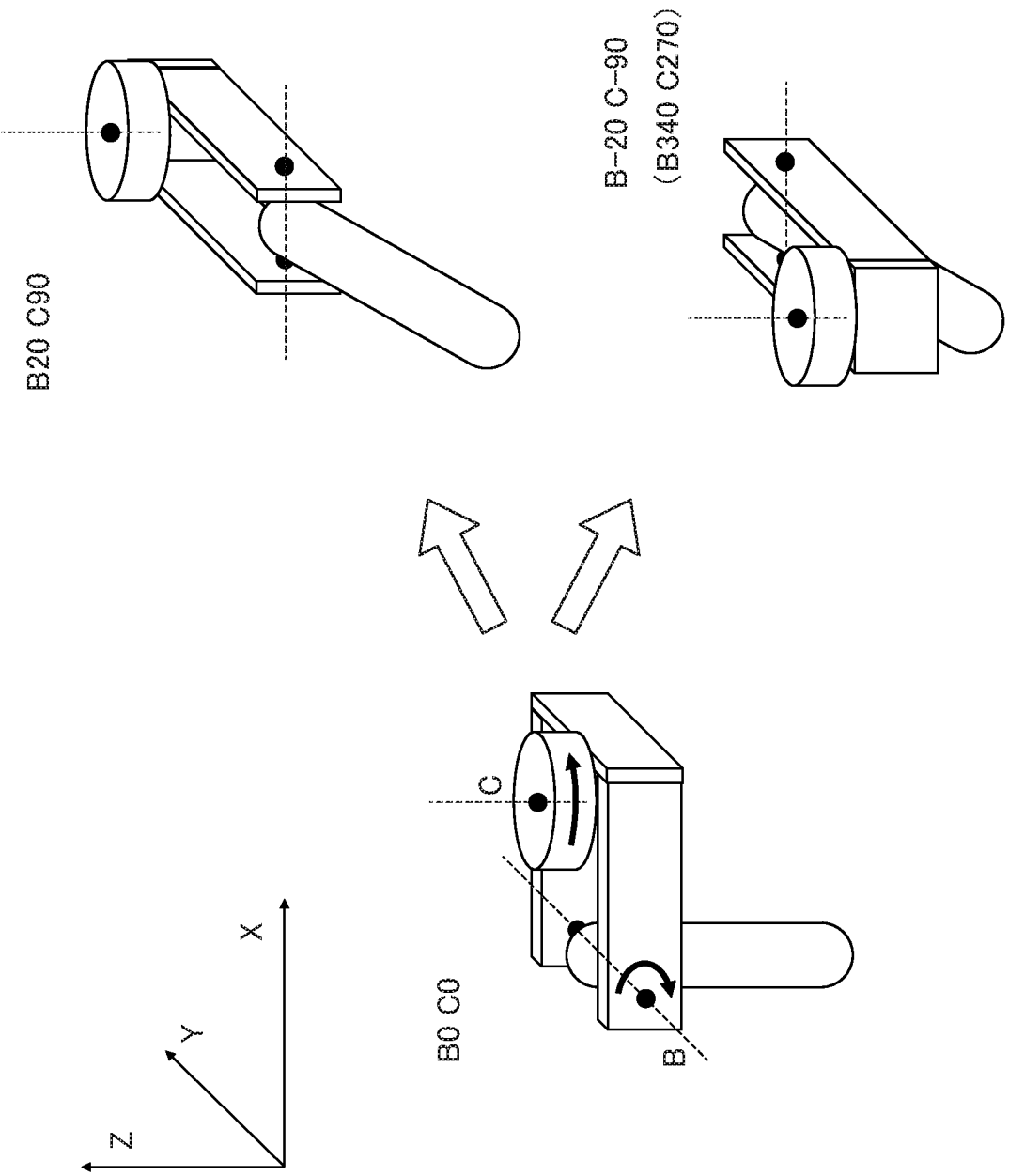
FIG. 18 is a diagram illustrating a singular point and two solutions.

FIG. 17 illustrates the movement of a rotary axis corresponding to FIG. 8. As described above with FIG. 14, FIG. 8 is a diagram in which it is assumed that the error is large (is approximately −15°) for better understanding of the aspect of error compensation. However, the error is generally a little smaller (|β| is 10 or smaller and is generally further smaller at 0.10 or smaller). In this case, the movement of the rotary axis from (b) to (c) in FIG. 17 is very small and is smoother than in Embodiment 1.

As described above, in the first method (a method of selecting a solution close to a previous solution), the rotary axis may deviate greatly from a command position. Therefore, an unexpected problem such as overtravel may occur. In the second method (a method of selecting a solution close to a command position), a block ending point is a command position. However, in the second method, when a singular point is passed through, a large movement of approximately 180° occurs in the C-axis and there is a problem that the movement of the rotary axis is not smooth. In the third method (a method of switching to another solution at a timing at which the movement of two rotary axes is minimized while selecting a solution close to a previous solution), a block ending point is a command position, and the movement of the C-axis when passing through the singular point is smaller as compared to the second method.

As illustrated in FIG. 4, it is assumed that there is a small tilting error β around the Y-axis in an installation position of a work. In this case, when the tilting error β is compensated so that the position and the direction of the tool with respect to a work are maintained, as illustrated in FIGS. 5 and 6, the tool is tilted by the tilting error β around the Y-axis during installation of the work.

Figure 19:
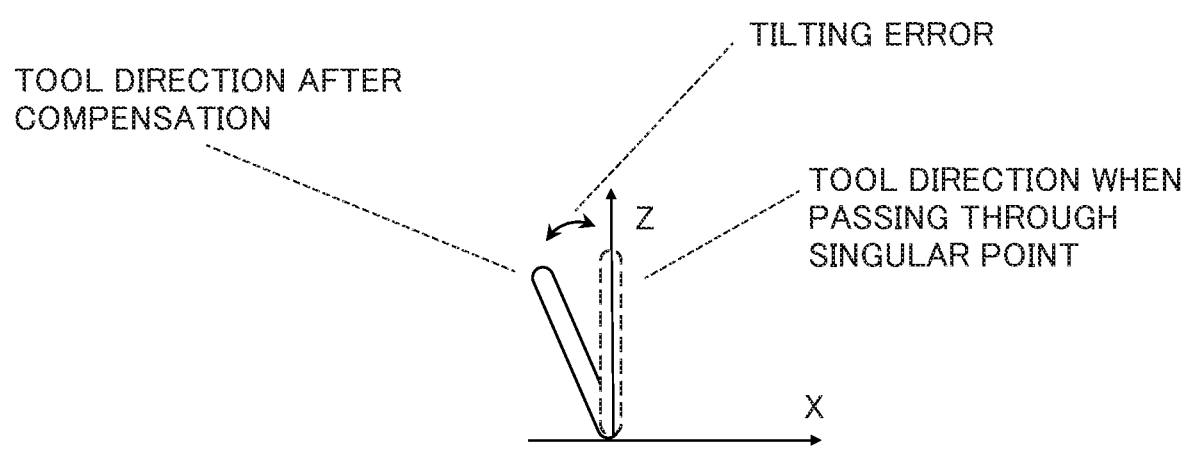
FIG. 19 is a diagram illustrating that, when a singular point (B=0°) is passed through in the second or third method, a tool direction deviates from an appropriate tool direction (a tool direction after work installation error compensation).

In the work installation error compensation according to the second or third method, when a command ranging from a command starting point to a command ending point crosses a singular point, as illustrated in FIG. 19, a tool direction (a tool direction when passing through a singular point) when passing through a singular point (B=0°) deviates (for example, rises) from an appropriate tool direction (a tool direction after work installation error compensation). For example, if the tilting error during work installation is small, no problem occurs since the deviation angle of the tool direction when passing through a singular point is small.

However, if the tilting error during work installation is large and the deviation angle of the tool direction when passing through a singular point increases (for example, a rising angle increases), an adverse effect on machining may occur. For example, interference between a work and a tool side surface or a machining fault during side surface machining may occur. In the work installation error compensation according to the first method, since the singular point is not passed through, a deviation of the tool direction does not occur. From the above, since the work installation error compensation according to the second or third method may have an adverse effect on machining, work installation error compensation according to the first method is preferably used as much as possible during cutting (machining).

Therefore, in the present embodiment, a command position is looked ahead, and simulation of the first method-based work installation error compensation is performed in advance. The first method-based work installation error compensation is employed as much as possible unless the compensated command position is outside a movable region of the machine tool whereas the second or third method-based work installation error compensation is employed when the compensated command position is outside the movable region of the machine tool.

First Embodiment

Figure 20:
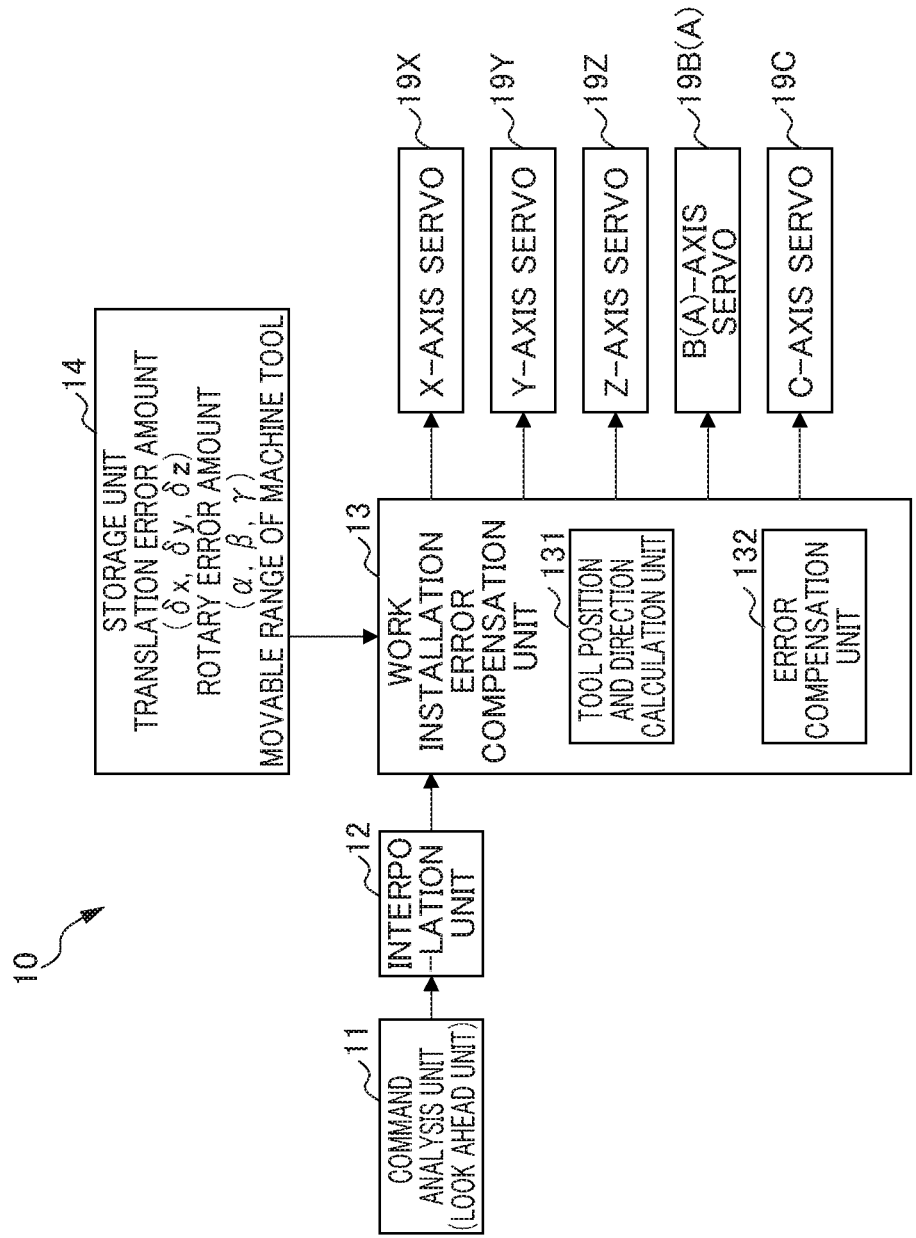
FIG. 20 is a diagram illustrating a configuration of a numerical controller according to a first embodiment.

FIG. 20 is a diagram illustrating a configuration of a numerical controller according to a first embodiment. A numerical controller 10 illustrated in FIG. 20 has a work installation error compensation function based on the first method and a work installation error compensation function based on the second method and selectively uses either one depending on the state of a machine tool.

The numerical controller 10 includes a command analysis unit (a look ahead unit) 11, an interpolation unit 12, a work installation error compensation unit 13, and a storage unit 14. The command analysis unit (the look ahead unit) 11 looks ahead commands from a program in units of one block. The command analysis unit 11 stores the looked ahead commands in a work memory or the like (not shown), for example. The interpolation unit 12 performs an interpolation process on the commands looked ahead by the command analysis unit 11 and generates a command position (a command value).

The work installation error compensation unit 13 includes a tool position and direction calculation unit 131 and an error compensation unit 132. The tool position and direction calculation unit 131 calculates the position and the direction on the command coordinate system of the tool on the basis of the command positions (command values) of the three linear axes and the two rotary axes. The error compensation unit 132 performs error compensation with respect to the three linear axes and the two rotary axes using an error amount (a translation error amount ($\delta x, \delta y, \delta z$) and a rotary error amount ($\alpha, \beta, \gamma$)) set in advance in the storage unit 14 so as to correspond to an installation error when a work is installed so that the position and the direction on the command coordinate system of the tool calculated by the tool position and direction calculation unit 131 are maintained on the work having an installation error.

(During Looking Ahead of Program)

When the looked ahead command is a command of a cutting mode (a machining mode), the work installation error compensation unit 13 performs a work installation error compensation process based on the first method (a method of selecting a solution close to a previous solution) with respect to the command position (command value) interpolated by the interpolation unit 12 and calculates a compensation command position (a compensation command value) of each axis (that is, compensation command positions of X, Y, Z, B(A), and C-axes). The work installation error compensation unit 13 sets first method-based error compensation when the compensation command position is within the movable region of the machine tool set in advance in the storage unit 14. On the other hand, when the compensation command position is outside the movable region of the machine tool (that is, overtravel occurs), the work installation error compensation unit 13 sets error compensation based on the second method (a method of selecting a solution close to a command value). For example, the work installation error compensation unit 13 sets the first method-based error compensation by setting an OT flag of [Nxx to Nxx]=0 to the corresponding cutting modes (machining modes) Nxx to Nxx and sets the second method-based error compensation by setting an OT flag of [Nxx to Nxx]=1 to the corresponding cutting modes (machining modes) Nxx to Nxx.

When the looked ahead command is a command of a positioning mode, the work installation error compensation unit 13 sets the second method-based error compensation by setting an OT flag of [Nxx to Nxx]=1 to the corresponding positioning modes Nxx to Nxx without performing the first method-based work installation error compensation.

(During Execution of Program)

When the OT flag [Nxx to Nxx] for the cutting mode (machining mode) Nxx to Nxx is 0, the work installation error compensation unit 13 performs the first method-based work installation error compensation. On the other hand, when the OT flag [Nxx to Nxx] for the cutting mode (machining mode) Nxx to Nxx is 1, the work installation error compensation unit 13 performs the second method-based work installation error compensation.

The storage unit 14 stores the predetermined error amount (a translation error amount ($\delta x, \delta y, \delta z$) and a rotary error amount ($\alpha, \beta, \gamma$)). Moreover, the storage unit 14 stores the predetermined movable range of the machine tool. The storage unit 14 is a rewritable memory such as EEPROM, for example.

The numerical controller 10 (and a numerical controller 10A to be described later) is configured as an arithmetic processor such as a digital signal processor (DSP) or a field-programmable gate array (FPGA), for example. Various functions of the numerical controller 10 (and the numerical controller 10A to be described later) are realized by executing predetermined software (programs) stored in a storage unit, for example. Various functions of the numerical controller 10 (and the numerical controller 10A to be described later) may be realized by cooperation of hardware and software and may be realized by hardware (electronic circuits) only.

Figure 21:
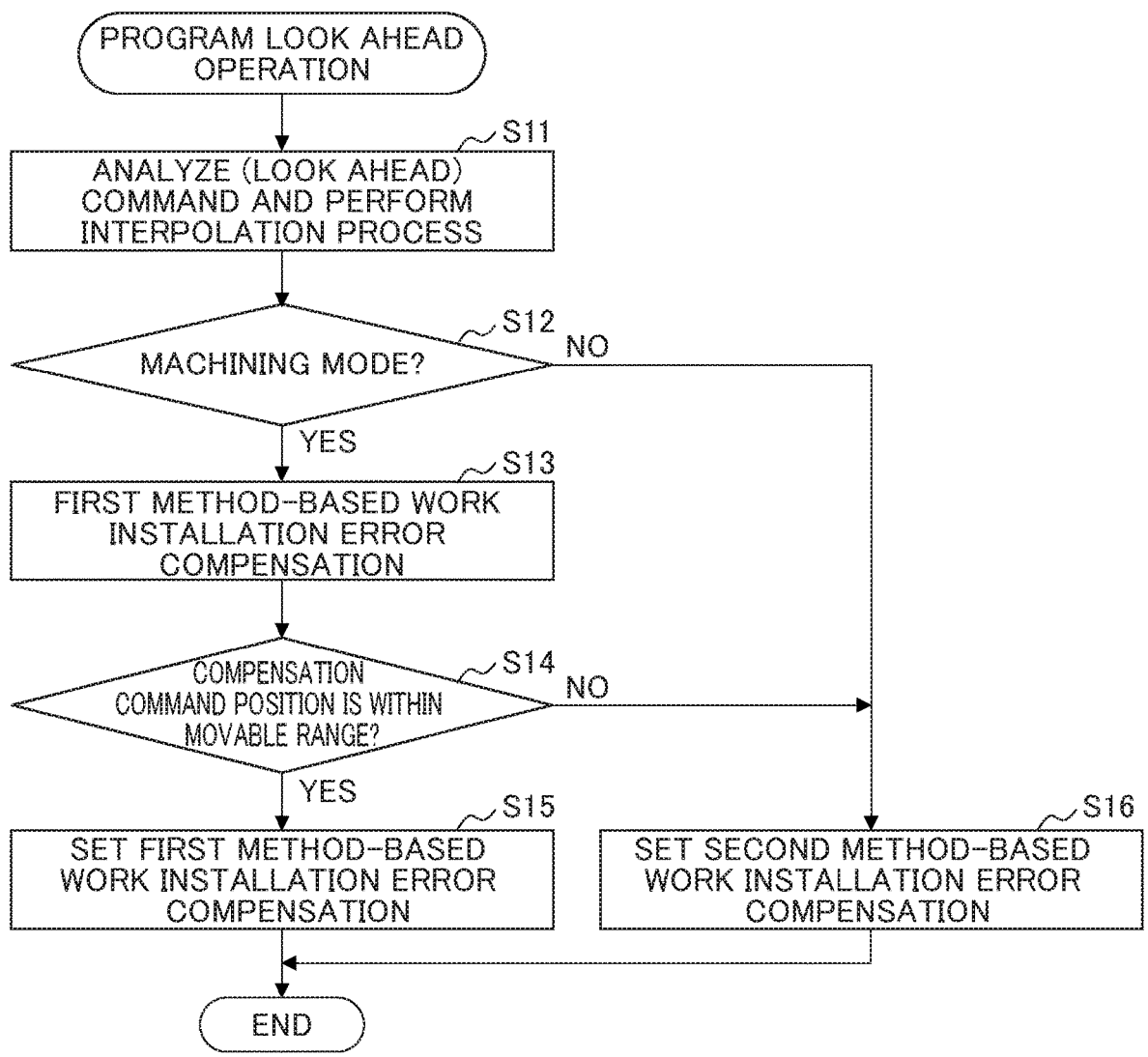
FIG. 21 is a flowchart of a program look ahead operation performed by the numerical controller according to the first embodiment.
Figure 22:
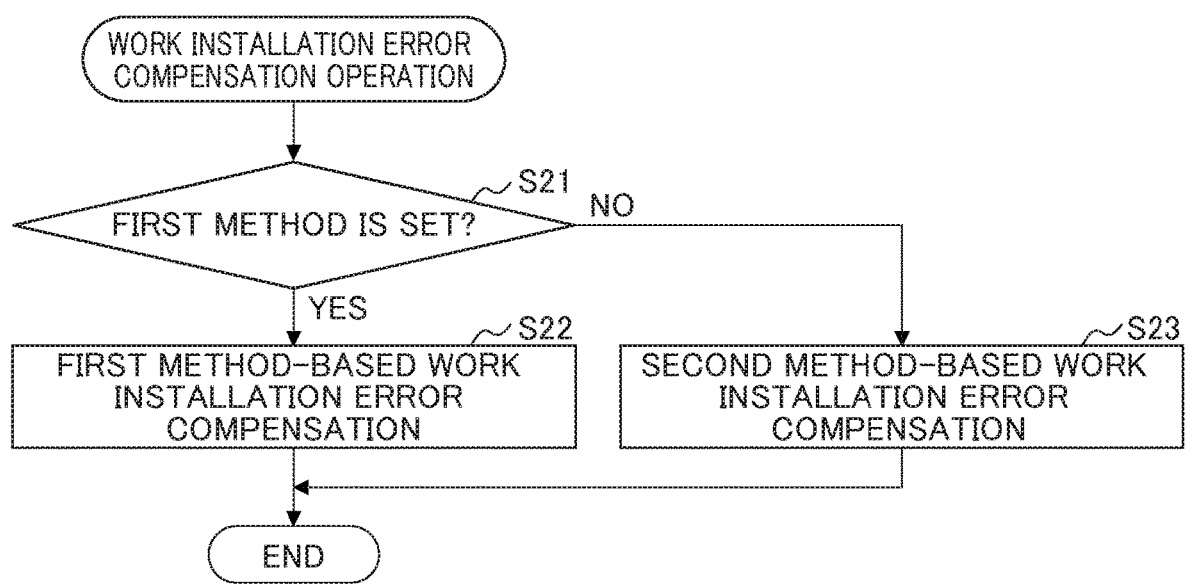
FIG. 22 is a flowchart of a work installation error compensation operation during execution of a program by the numerical controller according to the first embodiment.

Next, a program look ahead operation performed by the numerical controller 10 according to the first embodiment and a work installation error compensation operation during program execution will be described. FIG. 21 is a flowchart of a program look ahead operation performed by the numerical controller 10 according to the first embodiment, and FIG. 22 is a flowchart of a work installation error compensation operation during program execution performed by the numerical controller 10 according to the first embodiment. FIG. 23 is a diagram illustrating an example of a program.

First, a program look ahead operation performed by the numerical controller 10 according to the first embodiment will be described with reference to FIG. 21. First, the command analysis unit (a look ahead unit) 11 looks ahead commands from a program in units of one block and stores the commands in a work memory, for example (S11). Subsequently, the interpolation unit 12 performs an interpolation process on the looked ahead commands and generates a command position (command value) (S11).

Subsequently, the work installation error compensation unit 13 determines whether the looked ahead command is a command of a cutting mode (machining mode) for each of cutting modes (machining modes) or positioning modes (S12). When the looked ahead command is a command of a cutting mode, the work installation error compensation unit 13 performs work installation error compensation based on the first method (a method of selecting a solution close to a previous solution) for each of a plurality of blocks of the cutting mode and calculates the compensation command position (a compensation command value) of each axis (S13).

Subsequently, the work installation error compensation unit 13 determines whether the compensation command position is within the movable region of the machine tool (S14). When all compensation command positions in the plurality of blocks of the cutting mode (machining mode) are within the movable region of the machine tool, the first method-based work installation error compensation is set to the cutting mode (S15). For example, the work installation error compensation unit 13 sets the first method-based error compensation by setting an OT flag of [Nxx to Nxx]=0 to the cutting mode (machining mode) Nxx to Nxx. On the other hand, when at least one of the compensation command positions of the plurality of blocks of the cutting mode (machining mode) is outside the movable region of the machine tool (that is, overtravel occurs), the work installation error compensation unit 13 sets the work installation error compensation based on the second method (a method of selecting a solution close to a command value) to the cutting mode (S16). For example, the work installation error compensation unit 13 sets the second method-based error compensation by setting an OT flag of [Nxx to Nxx]=1 to the corresponding cutting modes (machining modes) Nxx to Nxx.

(For Example, N101 to N199 and N201 to N299 in FIG. 23).

On the other hand, when the looked ahead command is a command of the positioning mode in step S12, the work installation error compensation unit 13 sets the second method-based error compensation by setting an OT flag of [Nxx to Nxx]=1 to the corresponding positioning modes Nxx to Nxx (S16).

(For Example, N2, N200, and N300 in FIG. 23).

Next, a work installation error compensation operation during program execution performed by the numerical controller 10 according to the first embodiment will be described with reference to FIG. 22. First, the work installation error compensation unit 13 determines whether the first method-based work installation error compensation is set for each of cutting modes (machining modes) or positioning modes (for example, whether the OT flag of [Nxx to Nxx] is 0) (S21). When the OT flag of [Nxx to Nxx] is 0 (that is, when the first method-based work installation error compensation is set), the work installation error compensation unit 13 performs the work installation error compensation based on the first method (a method of selecting a solution close to a previous solution) for each cutting mode (S22).

On the other hand, when the OT flag of [Nxx to Nxx] is 1 (that is, when the second method-based work installation error compensation is set), the work installation error compensation unit 13 performs work installation error compensation based on the second method (a method of selecting a solution close to a command value) for each of the cutting modes or positioning modes (S23).

As described above, according to the numerical controller 10 of the first embodiment, a command position is looked ahead, and simulation of the first method-based work installation error compensation is performed in advance during a machining mode. The work installation error compensation based on the first method (a method of selecting a solution close to a previous solution) is set when a compensated command position is within a movable range of a machine tool whereas the work installation error compensation based on the second method (a method of selecting a solution close to a command value) is only set when the compensated command position is outside the movable range of the machine tool (that is, overtravel occurs) In this way, in the second method-based work installation error compensation, when a command ranging from a command starting point to a command ending point crosses a singular point, it is possible to prevent a tool direction from deviating from a tool direction after the work installation error compensation. Therefore, it is possible to suppress an adverse effect on machining resulting from a tool direction deviating (for example, rising) from an appropriate direction (a tool direction after work installation error compensation) when passing through a singular point.

The work installation error compensation method is set for each machining mode. In this way, the work installation error compensation method is not switched during one machining mode, and an adverse effect on machining can be avoided.

Since the problem of an adverse effect on machining is not present during the positioning mode, the second method-based error compensation may be set without performing the first method-based work installation error compensation.

Second Embodiment

Figure 24:
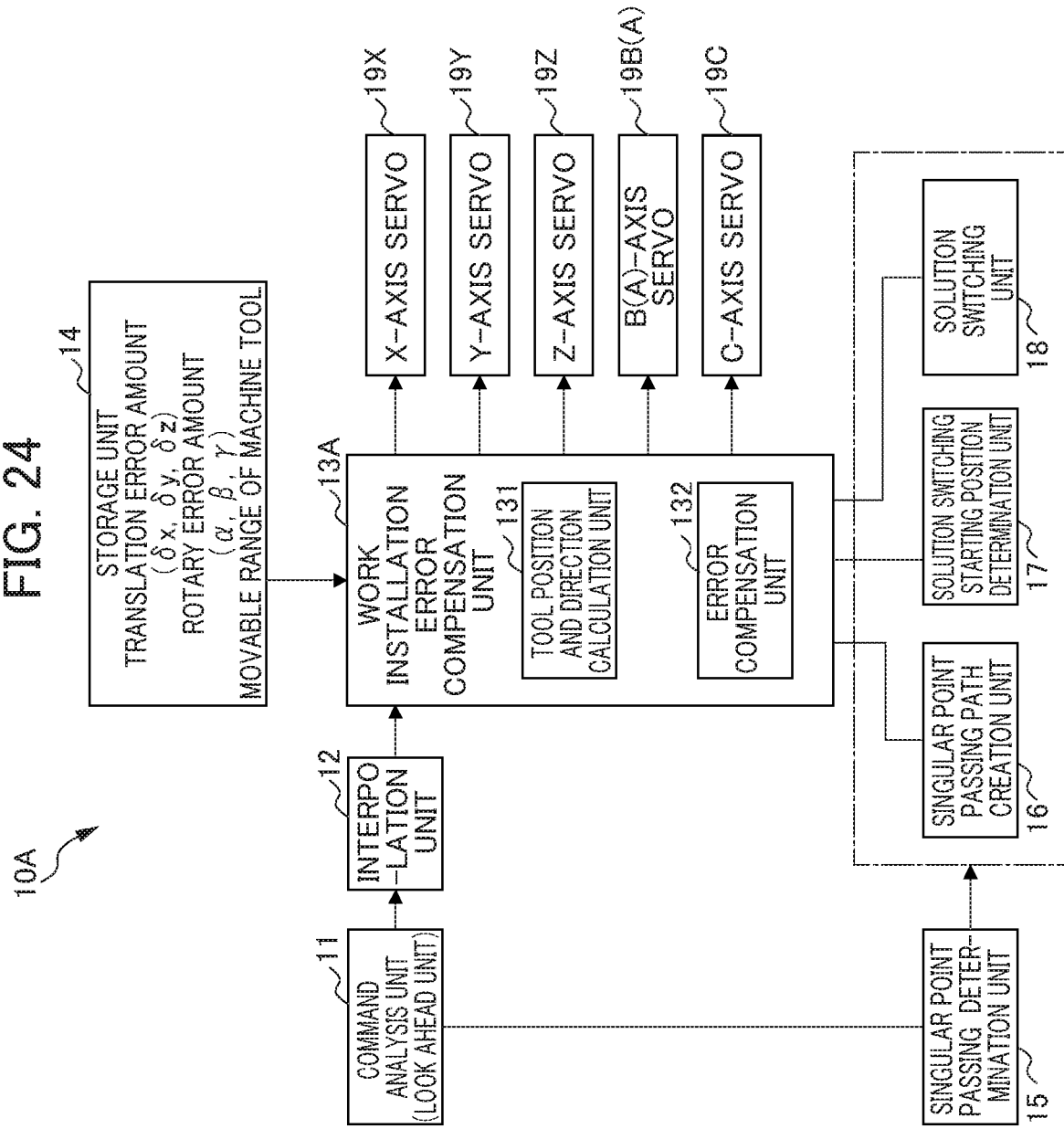
FIG. 24 is a diagram illustrating a configuration of a numerical controller according to a second embodiment.

FIG. 24 is a diagram illustrating a configuration of a numerical controller according to a second embodiment. A numerical controller 10A illustrated in FIG. 24 includes a work installation error compensation function based on the first method and a work installation error compensation function based on the third method and selectively uses either one according to the state of a machine tool.

The numerical controller 10A illustrated in FIG. 24 is different from that of the first embodiment in that the numerical controller 10A includes a work installation error compensation unit 13A instead of the work installation error compensation unit 13 of the numerical controller 10 illustrated in FIG. 20. The numerical controller 10A includes a singular point passing determination unit 15, a singular point passing path creation unit 16, a solution switching starting position determination unit 17, and a solution switching unit 18.

(During Looking Ahead of Program)

The work installation error compensation unit 13A is different from the work installation error compensation unit 13 illustrated in FIG. 20 in that, when a compensation command position is outside a movable region of a machine tool (that is, overtravel occurs), the work installation error compensation unit 13A sets error compensation based on the third method (a method of switching to another solution at a timing at which the movement of the two rotary axes is minimized while selecting a solution close to a previous solution) rather than the second method. For example, the work installation error compensation unit 13A sets the third method-based error compensation by setting an OT flag of [Nxx to Nxx]=1 to the corresponding cutting modes (machining modes) Nxx to Nxx.

The work installation error compensation unit 13A is different from the work installation error compensation unit 13 illustrated in FIG. 20 in that, when the looked ahead command is a command of a positioning mode, the work installation error compensation unit 13A sets the third method-based error compensation rather than the second method by setting an OT flag of [Nxx to Nxx]=1 to the corresponding positioning mode Nxx to Nxx without performing the first method-based work installation error compensation.

(During Execution of Program)

The work installation error compensation unit 13A is different from the work installation error compensation unit 13 illustrated in FIG. 20 in that, when the OT flag [Nxx to Nxx] for the cutting mode (machining mode) or the positioning mode Nxx to Nxx is 1, the work installation error compensation unit 13A performs the third method-based work installation error compensation rather than the second method.

When the tilting rotary axis command is on opposite sides across the singular point between the two command positions of the command starting point and the command ending point for each block command of a program command, the singular point passing determination unit 15 determines that the tilting rotary axis command needs to pass through the singular point and notifies the singular point passing path creation unit 16, the solution switching starting position determination unit 17, and the solution switching unit 18 of the determination result as a flag (F_Ps to be described later) of 1. The solution switching starting position determination unit 17 determines a solution switching starting position and the singular point passing path creation unit 16 creates a path in which the tilting rotary axis passes through the singular point and outputs the path to the work installation error compensation unit 13. The solution switching unit 18 performs interpolation of a solution switching path from Solution A to Solution B or from Solution B to Solution A created by the singular point passing path creation unit 16.

In other words, when the sign of the tilting rotary axis command is inverted between the two command positions of the command starting point and the command ending point of the five-axis machine tool in which the tilting rotary axis position of 0° is the singular point is inverted, the singular point passing determination unit 15 determines that the tilting rotary axis command is on opposite sides across the singular point between the two command positions and that the tilting rotary axis command needs to pass through the singular point. Alternatively, when the signs of ((Command starting point)-(Singular point)) and ((Command ending point)-(Singular point)) for the tilting rotary axis command are inverted between the two command positions of the five-axis machine tool in which a position other than the tilting rotary axis position of 0° is the singular point, the singular point passing determination unit 15 determines that the tilting rotary axis command is on opposite sides across the singular point between the two command positions and that the tilting rotary axis command needs to pass through the singular point. When the singular point passing determination unit 15 determines that it is necessary to pass through the singular point, the singular point passing path creation unit 16 creates a singular point passing path in which the tilting rotary axis passes through the singular point between the two command positions as a path obtained as the result of the compensation performed by the error compensation unit 132. The singular point passing path creation unit 16 includes the solution switching starting position determination unit 17 that determines a position at which the solution selected presently is switched to another solution and the solution switching unit 18 for switching to another solution in a coordinate system of the two rotary axes. The solution switching starting position determination unit 17 determines that a singular point closest position at which the selected solution approaches closest to the singular point on the command path is a solution switching starting position. The singular point closest position is a position at which the distance between the singular point position and the positions of the two rotary axes in the coordinate system of the two rotary axes is the smallest. Alternatively, the singular point closest position is a position at which the amount obtained by adding the absolute values of the singular point position and the positions of the two rotary axes in the coordinate system of the two rotary axes is the smallest. The solution switching unit 18 realizes switching of solutions by creating a path in which the command position is a position symmetric to the command position of the solution switching starting position about the singular point on the command path of the coordinate system of the two rotary axes, and switching is performed to the other solution linearly. The solution switching unit 18 realizes switching of solutions by creating a path in which the command position is a position symmetric to the command position of the solution switching starting position about the singular point on the command path of the coordinate system of the two rotary axes, and switching is performed to the other solution along a curve.

Figure 25:
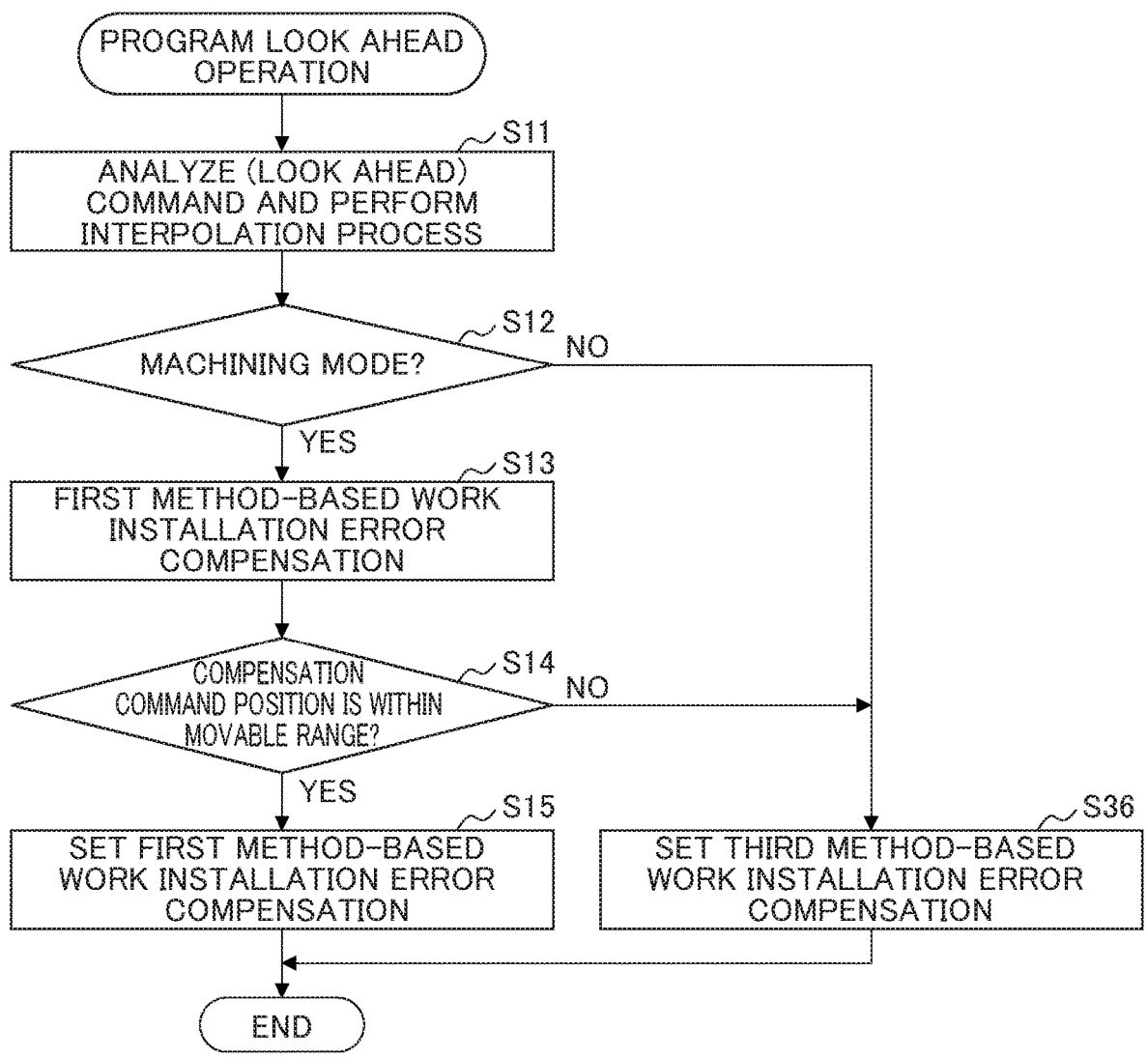
FIG. 25 is a flowchart of a program look ahead operation performed by the numerical controller according to the second embodiment.
Figure 26:
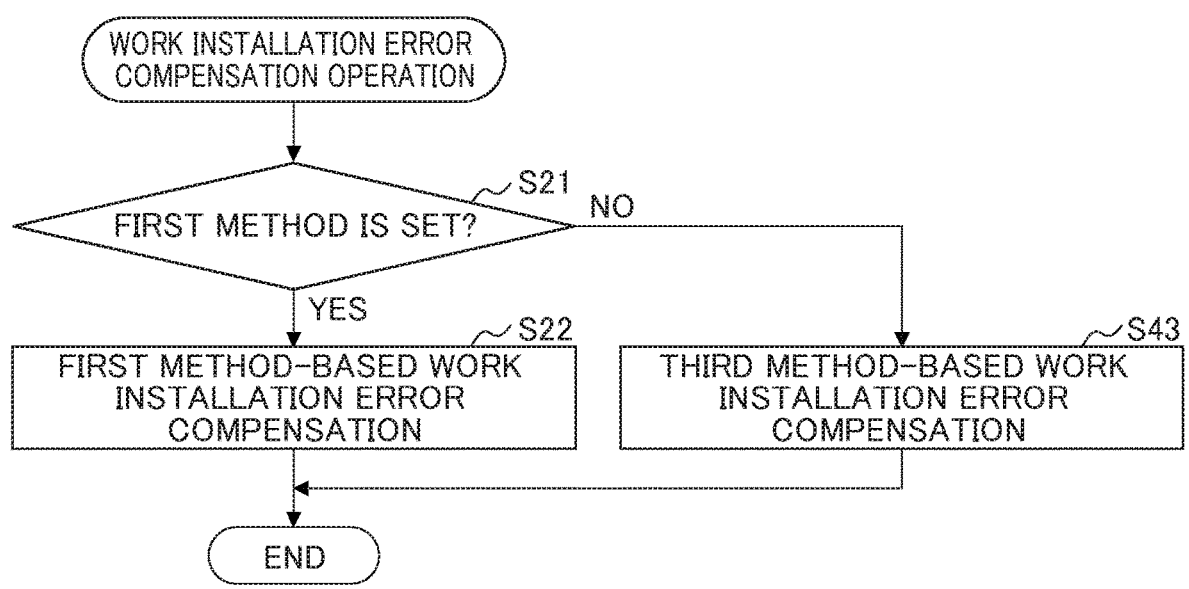
FIG. 26 is a flowchart of a work installation error compensation operation during execution of a program by the numerical controller according to the second embodiment.

Next, a program look ahead operation performed by the numerical controller 10A according to the second embodiment and a work installation error compensation operation during program execution will be described. FIG. 25 is a flowchart of a program look ahead operation performed by the numerical controller 10A according to the second embodiment, and FIG. 26 is a flowchart of a work installation error compensation operation during program execution performed by the numerical controller 10A according to the second embodiment. FIG. 27 is a diagram illustrating an example of a program.

First, a program look ahead operation performed by the numerical controller 10A according to the second embodiment will be described with reference to FIG. 25. The operations of steps S11 to S15 in FIG. 25 are the same as the operations of steps S11 to S15 in FIG. 21.

When at least one of the compensation command positions of the plurality of blocks of the cutting mode (machining mode) is outside the movable region of the machine tool (that is, overtravel occurs) in step S15, the work installation error compensation unit 13A sets the work installation error compensation based on the third method (a method of switching to another solution at a timing at which the movement of the two rotary axes is minimized while selecting a solution close to a previous solution) to the cutting mode (S36). For example, the work installation error compensation unit 13A sets the third method-based error compensation by setting an OT flag of [Nxx to Nxx]=1 to the corresponding cutting modes (machining modes) Nxx to Nxx.

(For Example, N101 to N199 and N201 to N299 in FIG. 27).

When the looked ahead command is a command of the positioning mode in step S12, the work installation error compensation unit 13A sets the third method-based error compensation by setting an OT flag of [Nxx to Nxx]=1 to the corresponding positioning modes Nxx to Nxx (S36).
(For Example, N2, N200, and N300 in FIG. 27).

Next, a work installation error compensation operation during program execution performed by the numerical controller 10A according to the second embodiment will be described with reference to FIG. 26. The operations of steps S21 and S22 in FIG. 26 are the same as the operations of steps S21 and S22 in FIG. 22. When the OT flag [Nxx to Nxx] is 1 in step S21 (that is, the third method-based work installation error compensation is set), the work installation error compensation unit 13A performs work installation error compensation based on the third method (a method of switching to another solution at a timing at which the movement of the two rotary axes is minimized while selecting a solution close to a previous solution) for each of cutting modes and positioning modes (S43).

According to the numerical controller 10A of the second embodiment, a command position is looked ahead, and simulation of the first method-based work installation error compensation is performed in advance during a machining mode. The work installation error compensation based on the first method (a method of selecting a solution close to a previous solution) is set when a compensated command position is within a movable range of a machine tool whereas the work installation error compensation based on the third method (a method of switching to another solution at a timing at which the movement of the two rotary axes is minimized while selecting a solution close to a previous solution) is only set when the compensated command position is outside the movable range of the machine tool (that is, overtravel occurs). In this way, in the third method-based work installation error compensation, when a command ranging from a command starting point to a command ending point crosses a singular point, it is possible to prevent a tool direction from deviating from a tool direction after the work installation error compensation. Therefore, it is possible to suppress an adverse effect on machining resulting from a tool direction deviating (for example, rising) from an appropriate direction (a tool direction after work installation error compensation) when passing through a singular point.

While embodiments of the present invention have been described, the present invention is not limited to the above-described embodiments and various changes and modifications can be made.

EXPLANATION OF REFERENCE NUMERALS 10, 10A: Numerical controller
11: Command analysis unit (look ahead unit)
12: Interpolation unit
13, 13A: Work installation error compensation unit
14: Storage unit
15: Singular point passing determination unit
16: Singular point passing path creation unit
17: Solution switching starting position determination unit
18: Solution switching unit
131: Tool position and direction calculation unit
132: Error compensation unit

What is claimed is:

1. A numerical controller that controls a five-axis machine tool that machines a work attached to a table using three linear axes and two rotary axes, comprising:
a work installation error compensation unit that compensates an installation error during installation of the work,
the work installation error compensation unit including:
a tool position and direction calculation unit that calculates a position and a direction on a command coordinate system of a tool on the basis of command values of the three linear axes and the two rotary axes; and
an error compensation unit that performs error compensation with respect to the three linear axes and the two rotary axes using an error amount set in advance so as to correspond to the installation error during installation of the work so that the position and the direction on the command coordinate system of the tool calculated by the tool position and direction calculation unit are maintained on the work having the installation error, the error compensation unit selecting the positions of the two rotary axes to be compensated according to a first method of selecting a solution close to a previous solution or either one of a second method of selecting a solution close to the command value on the command coordinate system or a third method of switching to another solution at a timing at which movement of the two rotary axes is minimized while selecting a solution close to a previous solution when a plurality of solutions of trigonometric calculation is present, the numerical controller driving each axis on the basis of coordinate values of the three linear axes and the two rotary axes calculated by the work installation error compensation unit, the numerical controller further comprising:

a look ahead unit that looks ahead a program, wherein the work installation error compensation unit performs error compensation on the looked ahead command value according to the first method to obtain a compensation command value, the work installation error compensation unit sets the first method-based error compensation when the compensation command value is within a movable region of the five-axis machine tool and sets either one of the second method-based error compensation or the third method-based error compensation when the compensation command value is outside the movable region of the five-axis machine tool, the tool position and direction calculation unit, the error compensation unit, and the look ahead unit are instructions of a control program, and the work installation error compensation unit is either:
  the control program, which is executed by a processor of the numerical controller, or
  a processor configured to execute the control program.

2. The numerical controller according to claim 1, wherein when the looked ahead command is a command of a machining mode,
  the work installation error compensation unit sets the first method-based error compensation to the machining mode when all of the compensation command values in a plurality of blocks of the machining mode are within the movable region of the five-axis machine tool, and
  the work installation error compensation unit sets either one of the second method-based error compensation or the third method-based error compensation to the machining mode when at least one of the compensation command values in the plurality of blocks of the machining mode is outside the movable region of the five-axis machine tool.

3. The numerical controller according to claim 1, wherein the work installation error compensation unit sets either one of the second method-based error compensation or the third method-based error compensation when the looked ahead command is a command of a positioning mode.

4. The numerical controller according to claim 1, wherein the work installation error compensation unit is further configured to set the error amount in advance by measuring the installation error as a shift amount of the work when the work is installed, the shift amount being based on a shift from an original work position to an actual work position.

5. The numerical controller according to claim 1, wherein,
  the compensation command value is determined to be outside the movable region when overtravel occurs, and
  the compensation command value is determined to be within the movable region when overtravel does not occur.

6. The numerical controller according to claim 1, wherein,
  the error compensation unit selects the positions of the two rotary axes to be compensated according to the second method, and
  the work installation error compensation unit sets the second method-based error compensation when the compensation command value is outside the movable region.

7. The numerical controller according to claim 1, wherein,
  the look ahead unit looks ahead of a command position by performing a simulation of the first method, and
  the work installation error compensation unit sets the first method in advance when a compensation command position is within the movable region based on the simulation.

8. The numerical controller according to claim 1, wherein,
  the first method generates a first solution including a first intermediate point for a first part of a path in which the compensation command value is within the movable region of the five-axis machine tool,
  at least one of the second method and the third method generates a second solution including a second intermediate point for a second part of the path in which the compensation command value is outside the movable region of the five-axis machine tool, and
  the work installation error compensation unit sets the path of the five-axis machine tool to include the first part of the path including the first intermediate point and the second part of the path including the second intermediate point.

9. The numerical controller according to claim 8, wherein,
  the work installation error compensation unit sets the path of the five-axis machine tool by connecting the first intermediate point of the first part of the path and the second intermediate point of the second part of the path.

* * * * *